United States Patent
Strandborg et al.

(10) Patent No.: US 12,430,841 B2
(45) Date of Patent: Sep. 30, 2025

(54) FOVEATED RENDERING USING NEURAL RADIANCE FIELDS

(71) Applicant: Varjo Technologies Oy, Helsinki (FI)

(72) Inventors: Mikko Strandborg, Helsinki (FI); Kimmo Roimela, Helsinki (FI)

(73) Assignee: Varjo Technologies Oy, Helsinki (FI)

( * ) Notice: Subject to any disclaimer, the term of this patent is extended or adjusted under 35 U.S.C. 154(b) by 330 days.

(21) Appl. No.: 18/306,304

(22) Filed: Apr. 25, 2023

(65) Prior Publication Data

US 2024/0362853 A1   Oct. 31, 2024

(51) Int. Cl.
| | |
|---|---|
| *G06T 15/20* | (2011.01) |
| *G06F 3/01* | (2006.01) |
| *G06T 5/77* | (2024.01) |
| *G06T 7/50* | (2017.01) |
| *G06T 15/06* | (2011.01) |
| *G06T 19/00* | (2011.01) |
| *G06T 19/20* | (2011.01) |

(52) U.S. Cl.
CPC .............. *G06T 15/20* (2013.01); *G06F 3/013* (2013.01); *G06T 5/77* (2024.01); *G06T 7/50* (2017.01); *G06T 15/06* (2013.01); *G06T 19/006* (2013.01); *G06T 19/20* (2013.01); *G06T 2207/10024* (2013.01); *G06T 2207/10028* (2013.01); *G06T 2207/20021* (2013.01); *G06T 2207/20081* (2013.01); *G06T 2207/20084* (2013.01); *G06T 2219/2012* (2013.01)

(58) Field of Classification Search
CPC .. G06T 15/20; G06T 7/50; G06T 5/77; G06T 15/06; G06T 19/006; G06T 19/20; G06T 2207/10024; G06T 2207/10028; G06T 2207/20021; G06T 2207/20081; G06T 2207/20084; G06T 2219/2012; G06F 3/013

See application file for complete search history.

(56) References Cited

PUBLICATIONS

Deng, Nianchen, et al. "Fov-nerf: Foveated neural radiance fields for virtual reality." IEEE Transactions on Visualization and Computer Graphics 28.11 (2022): 3854-3864. (Year: 2022).*

(Continued)

*Primary Examiner* — Xin Sheng
(74) *Attorney, Agent, or Firm* — Ziegler IP Law Group LLC.

(57) ABSTRACT

Disclosed is method including: obtaining neural network(s) trained for rendering images, wherein input of neural network(s) has 3D position of point in real-world environment and output of neural network(s) includes colour and opacity of point; obtaining 3D model(s) of real-world environment; receiving viewpoint from perspective of which image is to be generated; receiving gaze direction; determining region of real-world environment that is to be represented in image, based on viewpoint and field of view of image; determining gaze portion and peripheral portion of region of real-world environment, based on gaze direction, wherein gaze portion corresponds to gaze direction, while peripheral portion surrounds gaze portion; utilising neural network(s) to ray march for gaze portion, to generate gaze segment of image; and utilising 3D model(s) to generate peripheral segment of image.

21 Claims, 5 Drawing Sheets

(56) References Cited

PUBLICATIONS

Luo, Haimin, et al. "Convolutional neural opacity radiance fields." 2021 IEEE International Conference on Computational Photography (ICCP). IEEE, 2021 (Year: 2021).*

Kaplanyan, Anton S., et al. "DeepFovea: Neural reconstruction for foveated rendering and video compression using learned statistics of natural videos." ACM Transactions on Graphics (TOG) 38.6 (2019): 1-13 (Year: 2019).*

\* cited by examiner

FOVEATED RENDERING USING NEURAL RADIANCE FIELDS

TECHNICAL FIELD

The present disclosure relates to computer-implemented methods incorporating foveated rendering using neural radiance fields (NeRFs) or similar neural networks. The present disclosure also relates to systems incorporating foveated rendering using NeRFs or similar neural networks. The present disclosure further relates to computer program products incorporating foveated rendering using NeRFs or similar neural networks.

BACKGROUND

With advancements in evolving technologies such as immersive extended-reality (XR) technologies, demand for high-quality image generation has been increasing. It is desired that the image generation is performed in real time or near-real time. Several advancements are being made to develop image generation techniques that facilitate high-quality and realistic three-dimensional (3D) reconstruction of a real-world environment. Some existing image generation techniques typically rely on environment reconstruction using 3D point clouds, 3D meshing, machine learning (ML)-based approaches (for example, such as Neural Radiance Fields (NeRFs), Kilo-NeRFs, Block-NeRFs, Decomposed Radiance Fields (DeRFs), Instant Neural Graphics Primitives (Instant-NGP), Neural Sparse Voxel Fields (NSVF), or similar neural networks), image-based techniques, and the like.

However, existing techniques and equipment for implementing 3D reconstruction are associated with several limitations. Firstly, the existing techniques and equipment that rely purely on ML-based approaches for the 3D reconstruction are highly computationally-intensive and time consuming. This is because for a given viewpoint, each ray corresponding to each pixel that is to be rendered in a given image frame, is evaluated (namely, marched) by a neural network. In other words, an entirety of pixels are processed by the neural network in a same manner to a same extent of processing, for rendering the given image frame. For such processing, the existing techniques and equipment require considerable processing resources, long processing time, and high computing power. Secondly, the existing techniques and equipment are unable to cope with visual quality requirements that arise, for example, due to high-resolution (such as a resolution greater than or equal to 60 pixels per degree), small pixel size, high field-of-view (FOV), and high frame-rate requirements (such as a frame rate greater than or equal to 90 frames per second) in some display devices (such as XR devices). This adversely impacts image generation, and eventually leads to a non-immersive and unrealistic viewing experience for a user.

Therefore, in light of the foregoing discussion, there exists a need to overcome the aforementioned drawbacks.

SUMMARY

The present disclosure seeks to provide a computer-implemented method, a system, and a computer program product incorporating foveated rendering using neural radiance fields or similar neural networks. The aim of the present disclosure is achieved by a computer-implemented method, a system, and a computer program product which incorporate foveated rendering using neural radiance fields or similar neural networks as defined in the appended independent claims to which reference is made to. Advantageous features are set out in the appended dependent claims.

Embodiments of the present disclosure substantially eliminate or at least partially address the aforementioned problems in the prior art, and facilitate in generating high-quality, realistic, and foveated images using neural radiance fields (NeRFs) or similar neural networks, in computationally-efficient and time-efficient manner.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

BRIEF DESCRIPTION OF THE DRAWINGS

FIG. 3B is a schematic representation of how the colour image can be divided into a plurality of colour tiles, while

DETAILED DESCRIPTION OF EMBODIMENTS

Figure 1:
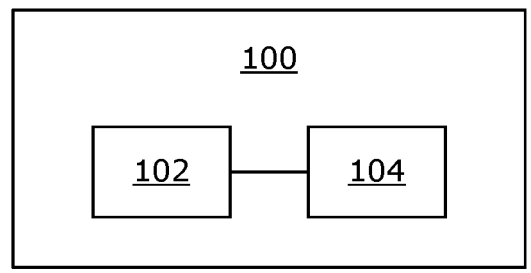
FIG. 1 illustrates a block diagram of an architecture of a system incorporating foveated rendering using neural radiance fields or other similar neural networks, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides a computer-implemented method comprising:
  obtaining at least one neural network trained for rendering images of a given real-world environment, wherein a given input of the at least one neural network comprises information indicative of a three-dimensional (3D) position of a given point in the given real-world environment and a given output of the at least one neural network comprises a colour and an opacity of the given point;

obtaining at least one 3D model of the given real-world environment;

receiving viewpoint information indicative of a given viewpoint from a perspective of which a given image is to be generated;

receiving gaze information indicative of a gaze direction of a given user;

determining a region of the given real-world environment that is to be represented in the given image, based on the given viewpoint and an angular width of a field of view to be covered in the given image;

determining a gaze portion and a peripheral portion of the determined region of the given real-world environment, based on the gaze direction of the given user, wherein the gaze portion corresponds to the gaze direction, while the peripheral portion surrounds the gaze portion;

utilising the at least one neural network to ray march for the gaze portion of the determined region of the given real-world environment, to generate a gaze segment of the given image that corresponds to the gaze portion of the determined region of the given real-world environment; and utilising the at least one 3D model of the given real-world environment, to generate a peripheral segment of the given image that corresponds to the peripheral portion of the determined region of the given real-world environment.

In a second aspect, an embodiment of the present disclosure provides a system comprising:

at least one data repository; and at least one server configured to:

obtain at least one neural network that is trained for rendering images of a given real-world environment, wherein a given input of the at least one neural network comprises information indicative of a three-dimensional (3D) position of a given point in the given real-world environment and a given output of the at least one neural network comprises a colour and an opacity of the given point;

obtain at least one 3D model of the given real-world environment, wherein the at least one 3D model is stored at the at least one data repository;

receive viewpoint information indicative of a given viewpoint from a perspective of which a given image is to be generated;

receive gaze information indicative of a gaze direction of a given user;

determine a region of the given real-world environment that is to be represented in the given image, based on the given viewpoint and an angular width of a field of view to be covered in the given image;

determine a gaze portion and a peripheral portion of the determined region of the given real-world environment, based on the gaze direction of the given user, wherein the gaze portion corresponds to the gaze direction, while the peripheral portion surrounds the gaze portion;

utilise the at least one neural network to ray march for the gaze portion of the determined region of the given real-world environment, to generate a gaze segment of the given image that corresponds to the gaze portion of the determined region of the given real-world environment; and utilise the at least one 3D model of the given real-world environment, to generate a peripheral segment of the given image that corresponds to the peripheral portion of the determined region of the given real-world environment.

In a third aspect, an embodiment of the present disclosure provides a computer program product comprising a non-transitory machine-readable data storage medium having stored thereon program instructions that, when executed by a processor, cause the processor to execute steps of a computer-implemented method of the first aspect.

The present disclosure provides the aforementioned method, the aforementioned system, and the aforementioned computer program product for facilitating generation of high-quality, realistic, and foveated images using neural radiance fields (NeRFs) or similar neural networks, in real time or near-real time. Herein, instead of generating an entirety of the given image by ray marching alone using the at least one neural network, different segments of the given image are generated in different manners. For example, only the gaze segment of the given image is generated by the ray marching, while the peripheral segment of the given image is generated by using the at least one 3D model. This is because the gaze portion of the determined region comprises gaze-contingent objects, as compared to the peripheral portion of the determined region that comprises non-gaze-continent objects. Thus, the gaze segment is highly accurately and realistically generated by using the at least one neural network, while the peripheral segment is only acceptably accurately generated, for which using the at least one 3D model is sufficient. Resultantly, an image quality of the given image so generated emulates image viewing quality and characteristics of human visual system. In particular, the given image has a spatially variable resolution and emulates a foveation effect of the human visual system. Such a manner of generating images is also computationally-efficient and time-efficient, as compared to prior art. Moreover, the method and the system are susceptible to easily cope with visual quality requirements that arise, for example, due to high-resolution (such as a resolution greater than or equal to 60 pixels per degree), small pixel size, high field-of-view (FOV), and high frame-rate requirements (such as a frame rate greater than or equal to 90 frames per second) in some display devices (such as XR devices). This improves image generation, and eventually leads to a highly immersive and realistic viewing experience for the given user. The method and the system are simple, robust, support real-time high-quality foveated image generation, and can be implemented with ease.

Notably, the at least one server controls an overall operation of the system. In some implementations, the at least one server is implemented as a remote server. In such implementations, the remote server obtains the at least one neural network and the at least one 3D model from the at least one data repository. In an example, the remote server could be a cloud server that provides a cloud computing service. In other implementations, the at least one server is implemented as a processor of a device comprising at least one camera or as a processor of a computing device communicably coupled to the device. Examples of the device include, but are not limited to, a head-mounted display (HMD) device and a teleport device. Examples of the computing device include, but are not limited to, a laptop, a desktop, a tablet, a phablet, a personal digital assistant, a workstation, and a console.

Notably, the at least one data repository is communicably coupled to the at least one server. It will be appreciated that the at least one data repository could be implemented, for example, such as a memory of the at least one server, a memory of the device, a memory of the computing device, a removable memory, a cloud-based database, or similar.

The term "head-mounted display" device refers to a specialized equipment that is configured to present an extended-reality (XR) environment to a given user when said HMD device, in operation, is worn by the given user on his/her head. The HMD device is implemented, for example, as an XR headset, a pair of XR glasses, and the like, that is operable to display a scene of the XR environment to the given user. The term "extended-reality" encompasses virtual reality (VR), augmented reality (AR), mixed reality (MR), and the like. The term "teleport device" refers to a specialized equipment that is capable of facilitating virtual teleportation.

It will be appreciated that the term "at least one server" refers to "a single server" in some implementations, and to "a plurality of servers" in other implementations. When the system comprises the single server, all operations of the system can be performed by the single server. When the system comprises the plurality of servers, different operations of the system can be performed by different (and specially configured) servers from amongst the plurality of servers. As an example, a first server from amongst the plurality of servers may be configured to utilise the at least one neural network to ray march for the gaze portion of the determined region to generate the gaze segment of the given image, and a second server from amongst the plurality of servers may be configured to utilise the at least one 3D model to generate the peripheral segment of the given image.

Notably, the at least one server is configured to obtain the at least one (trained) neural network. Optionally, the information indicative of the 3D position of the given point is in form of a 3D position in a given coordinate system. Optionally, the given coordinate system defines at least a position of a given point within a 3D space of the given real-world environment. Optionally, the given coordinate system has a predefined origin and three mutually perpendicular coordinate axes. The three mutually perpendicular coordinate axes could, for example, be X, Y, and Z axes. As an example, the given coordinate system may be a Cartesian coordinate system. Optionally, the 3D position of the given point in the given coordinate system is expressed as (x, y, z) position coordinates along the X, Y and Z axes, respectively. It will be appreciated that the given coordinate system also defines an orientation of the given point within the 3D space. Such an orientation could be expressed, for example, using rotation quaternions, Euler angles, rotation matrices, and the like.

Furthermore, optionally, the colour of the given point is represented by a colour value. Such a colour value could, for example, be a Red-Green-Blue (RGB) value, a Red-Green-Blue-Alpha (RGB-A) value, a Cyan-Magenta-Yellow-Black (CMYK) value, a Luminance and two-colour differences (YUV) value, a Red-Green-Blue-Depth (RGB-D) value, a Hue-Chroma-Luminance (HCL) value, a Hue-Saturation-Lightness (HSL) value, a Hue-Saturation-Brightness (HSB) value, a Hue-Saturation-Value (HSV) value, a Hue-Saturation-Intensity (HSI) value, a blue-difference and red-difference chroma components (YCbCr) value, or similar. Optionally, the opacity of the given point is represented by an alpha value. Alpha values are well-known in the art. Greater the alpha value, greater is the opacity of the given point, and lower is the transparency of the given point, and vice versa. In addition to this, greater the opacity of the given point, greater is the density of the given point. A non-zero density of the given point means that the given point in the 3D space could be occupied by an opaque object or its part. It is to be understood that when the opacity of the given point is zero or near-zero, it means that a region in the 3D space whereat the given point lies could either be empty (i.e., surrounded by air), or be occupied by a transparent object or its part.

It will be appreciated that the given input may also include other parameters, in addition to the information indicative of the 3D position of the given point in the given real-world environment. Optionally, in this regard, the given input of the at least one neural network further comprises a given viewing direction. In such a case, the given output comprises the colour of the given point with respect to the given viewing direction. In other words, the colour of the given point would be a view-dependent colour (or view-dependent irradiance at the given point).

Optionally, the at least one neural network is implemented as a Neural Radiance Field (NeRF) model. Typically, the NeRF model is a deep fully-connected neural network (namely, a machine learning-based model) without any convolutional layers (also referred to as a multilayer perceptron (MLP)). It will be appreciated that when the NeRF model is employed, the given input comprises the information indicative of the 3D position of the given point as well as the given viewing direction, and the given output comprises the view-dependent colour and the opacity of the given point. Such a NeRF model is described, for example, in "*NeRF: representing scenes as neural radiance fields for view synthesis*" by Ben Mildenhall et al., published in Proceedings of the European Conference on Computer Vision (ECCV), 2020, which has been incorporated herein by reference. It will be appreciated that any type of neural network (upon training) that could reproduce the given real-world environment, either via novel-view synthesis or by producing a 3D mesh or point cloud can be implemented.

In an example, when the at least one neural network is implemented as the NeRF model, using the aforementioned reference for sake of clarity and convenience, the colour of the given point can be mathematically expressed as:

$$C(r) = \int_{tn}^{tf} T(t)\sigma(r(t))c(r(t),\ d)dt$$

wherein
C(r) is the colour of the given point,
T(t) is an intensity of light that has been blocked till a point 't',
$\sigma(r(t))$ is density at the point 't',
c(r(t),d) is colour at a point r (t) with respect to a viewing angle 'd',
tn is an upper bound for a given ray, and
tf is a lower bound for the given ray.

It will be appreciated that when the at least one neural network is implemented as the NeRF model, the aforesaid information indicative of the 3D position and the given viewing direction could, for example, be represented as (x, y, z, θ, φ), wherein (x, y, z) are the position coordinates as mentioned earlier, and (θ, φ) are orientation angles with respect to any two of the aforesaid axes. In case of the NeRF model, the position coordinates and the orientation angles correspond to extrinsic parameters of at least one camera. It will also be appreciated that the given input to the at least one neural network could be encoded to facilitate the at least one neural network for determining features of an object or its part (present in the 3D space) at different resolutions.

Such an encoding is well-known in the art, and thus could be performed using well-known data encoding techniques (for example, such as a frequency encoding technique, a spherical harmonic encoding technique, or similar), or could be implemented as a part of training the at least one neural network (for example, by positional encoding, sparse grid embeddings, or any other similar technique).

Throughout the present disclosure, the term "three-dimensional model" of the given real-world environment refers to a data structure that comprises comprehensive information pertaining to objects or their parts present in the given real-world environment. Such comprehensive information is indicative of at least one of: surfaces of the objects or their parts, a plurality of features of the objects or their parts, shapes and sizes of the objects or their parts, poses of the objects or their parts, materials of the objects or their parts, colour information of the objects or their parts, depth information of the objects or their parts, light sources and lighting conditions within the given real-world environment. The term "object" refers to a physical object or a part of the physical object present in the given real-world environment. An object could be a living object (for example, such as a human, a pet, a plant, and the like) or a non-living object (for example, such as a wall, a window, a toy, a poster, a lamp, and the like). Examples of the plurality of features include, but are not limited to, edges, corners, blobs, and ridges.

Optionally, the at least one 3D model is in a form of at least one of: a 3D polygonal mesh, a 3D point cloud, a 3D surface cloud, a voxel-based model, a parametric model, a 3D grid, a 3D hierarchical grid, a bounding volume hierarchy, an image-based 3D model. The 3D polygonal mesh could be a 3D triangular mesh or a 3D quadrilateral mesh. It will be appreciated that when the at least one server obtains the at least one 3D model from the at least one data repository, the at least one 3D model is pre-generated (for example, by the at least one server), and pre-stored at the at least one data repository.

Optionally, the at least one 3D model is in a form of at least one 3D data structure comprising a plurality of nodes, each node representing a corresponding voxel of a 3D grid of voxels into which a 3D space occupied by the given real-world environment is divided, wherein a given node of the at least one 3D data structure stores given viewpoint information indicative of a given viewpoint from which a given colour image and a given depth image are captured, along with any of:
 (i) a given colour tile of the given colour image that captures colour information of a given voxel represented by the given node and a corresponding depth tile of the given depth image that captures depth information of the given voxel from a perspective of the given viewpoint,
 (ii) reference information indicative of unique identification of the given colour tile and the corresponding depth tile.

The term "voxel" refers to a 3D volumetric element that constitutes a portion of the 3D space occupied by the given real-world environment. Multiple voxels can be employed to represent the 3D space occupied by the given real-world environment. A given voxel corresponding to said portion of the 3D space represents colour information pertaining to said portion of the 3D space, and additionally optionally other attributes associated with said portion of the 3D space (for example, such as depth information, luminance information, transparency information, opacity information, and the like). The given voxel can be considered to be a 3D equivalent of a pixel. A shape of the given voxel could be a cube, a cuboid or some other convex polyhedron. Voxels are well-known in the art.

It will be appreciated that a number of nodes in the at least one 3D data structure is equal to a number of voxels in the 3D grid of voxels. Moreover, a given 3D region in the 3D space (represented by at least one voxel) may correspond to more than one node of the at least one 3D data structure. Examples of the at least one 3D data structure include, but are not limited to, an Octree, a Binary Space Partitioning (BSP) tree, a Quadtree, a bounding volume hierarchy (BVH), and hashed voxels. It will also be appreciated that a given node of the at least one 3D data structure could be an oriented bounding box (OBB), an axis-aligned bounding box (AABB), a discrete oriented polytope (DOP), or similar.

It is to be understood that the given colour image is a visual representation of the given real-world environment. The term "visual representation" encompasses colour information represented in the given colour image, and additionally optionally other attributes associated with the given colour image (for example, such as depth information, luminance information, transparency information, and the like). Optionally, the colour information represented in the given colour image is in form of at least one of: RGB values, RGB-A values, CMYK values, YUV values, RGB-D values, HCL values, HSL values, HSB values, HSV values, HSI values, YCbCr values.

Furthermore, the term "depth image" refers to an image comprising information pertaining to optical depths of objects or their parts present in the given real-world environment. In other words, the given depth image provides information pertaining to distances (namely, the optical depths) of surfaces of the objects or their parts from a given viewpoint and a given viewing direction of at least one camera capturing the given depth image. In an example, the given depth image could be an image comprising a plurality of pixels, wherein a pixel value of each pixel in said image indicates an optical depth of its corresponding real-world point/region within the given real-world environment.

In some implementations, a resolution of the given colour image is same as a resolution of the given depth image. In this regard, a number of pixels in the given colour tile and a number of pixels in the given depth tile are same. In other implementations, a resolution of the given colour image is different from a resolution of the given depth image. Optionally, the resolution of the given colour image is greater than the resolution of the given depth image. In this regard, the number of pixels in the given colour tile are greater than the number of pixels in the given depth tile.

Throughout the present disclosure, the term "viewpoint" encompasses both a viewing position at which the at least one camera is positioned in the given real-world environment as well as a viewing direction in which the at least one camera is capturing the given colour image and the given depth image. It will be appreciated that multiple objects or their parts present in the given real-world environment span across a field of view of the at least one camera; therefore, for the given colour image and the given depth image that are captured from a given viewpoint, light reflecting off these multiple objects or their parts is incident upon a sensor chip of the at least one camera at different incident angles. As an example, when an angular width of a horizontal field of view of the at least one camera is 90 degrees, said objects or their parts are captured in the given colour image and the given depth image such that information pertaining to the multiple objects or their parts is captured from −45 degrees to +45 degrees from a centre of the horizontal field of view.

Thus, a given viewpoint from which a given object or its part is captured not only depends on the viewing position and the viewing direction of the at least one camera, but also depends on which portion of the field of view of the at least one camera is the given object or its part captured. Information pertaining to the at least one camera will be discussed later in detail.

Throughout the present disclosure, the term "tile" of a given image refers to a segment of the given image. It will be appreciated that a given tile of the given image has a defined shape and/or size. In an example, a size of the given tile may be 32×32 pixels. In another example, a size of the given tile may be 50×100 pixels. Herein, the term "given tile" encompasses the given colour tile and/or the given depth tile, and the term "given image" encompasses the given colour image and/or the given depth image.

Optionally, the given node of the at least one 3D data structure either stores the given colour tile and the corresponding depth tile, or only stores the reference information of the given colour tile and the corresponding depth tile. Advantageously, storing only the reference information facilitates in representing the 3D space of the given real-world environment using the at least one 3D data structure in a highly space-efficient manner, because an amount of computing resources (for example, such as memory) required for processing the at least one 3D data structure is considerably reduced.

It will be appreciated that the given colour image and the given depth image could be identified using running number indices of the given colour image and the given depth image, respectively. Optionally, the unique identification of the given tile of the given image (namely, the given colour tile of the given colour image and/or the given depth tile of the given depth image) comprises any one of:

- position coordinates of at least one of four corners of the given tile of the given image,
- a row number and a column number of the given tile of the given image,
- position coordinates and dimensions in an atlas image, when tiles of the given image are packed into the atlas image.

As an example, when the tiles are equi-sized, position coordinates of only one corner, for example, a upper-left corner of the given tile is required for the unique identification. It will be appreciated that information pertaining to the row number and the column number of the given tile may require lesser number of bits, as compared to position coordinates. Hereinabove, the term "atlas image" refers to a type of image in which the colour tiles and the depth tiles are arranged (namely, packed), for example, in a space-efficient manner. The atlas image is well-known in the art.

Optionally, in the method, the step of obtaining the at least one 3D model comprises:

- receiving a plurality of colour images of the given real-world environment, a plurality of depth images corresponding to the plurality of colour images, and viewpoint information indicative of corresponding viewpoints from which the plurality of colour images and the plurality of depth images are captured, wherein 3D positions and orientations of the viewpoints are represented in a given coordinate system;
- dividing the 3D space occupied by the given real-world environment into the 3D grid of voxels, wherein the 3D grid is represented in the given coordinate system;
- creating the at least one 3D data structure;
- dividing the given colour image and the given depth image into a plurality of colour tiles and a plurality of depth tiles, respectively, wherein the plurality of depth tiles correspond to respective ones of the plurality of colour tiles;
- mapping the given colour tile of the given colour image to the given voxel in the 3D grid whose colour information is captured in the given colour tile, based on the given viewpoint and the depth information captured in the corresponding depth tile of the given depth image; and
- storing, in the given node of the at least one 3D data structure that represents the given voxel, the given viewpoint information indicative of the given viewpoint, along with any of: (i) the given colour tile and the corresponding depth tile, (ii) the reference information.

Optionally, the at least one server is configured to receive the plurality of colour images and the plurality of depth images from the at least one data repository, or from the device comprising the at least one camera. The term "camera" refers to an equipment that is operable to detect and process light signals received from the given real-world environment, so as to capture image(s) of the given real-world environment. Such images could be colour images and/or depth images of the given real-world environment. Optionally, the at least one camera is implemented as a visible-light camera. Examples of the visible-light camera include, but are not limited to, a Red-Green-Blue (RGB) camera, a Red-Green-Blue-Alpha (RGB-A) camera, a Red-Green-Blue-Depth (RGB-D) camera, an event camera, a Red-Green-Blue-White (RGBW) camera, a Red-Yellow-Yellow-Blue (RYYB) camera, a Red-Green-Green-Blue (RGGB) camera, a Red-Clear-Clear-Blue (RCCB) camera, a Red-Green-Blue-Infrared (RGB-IR) camera, and a monochrome camera. Alternatively, optionally, the at least one camera is implemented as a combination of a visible-light camera and a depth camera. Examples of the depth camera include, but are not limited to, a Red-Green-Blue-Depth (RGB-D) camera, a ranging camera, a Light Detection and Ranging (LiDAR) camera, a Time-of-Flight (ToF) camera, a Sound Navigation and Ranging (SONAR) camera, a laser rangefinder, a stereo camera, a plenoptic camera, and an infrared (IR) camera.

In some implementations, both the given colour image and the given depth image are captured using a single camera. As an example, the aforesaid images may be captured as an RGB-D image using the single camera. In other implementations, the given colour image and the given depth image are captured separately by using separate cameras. As an example, the given colour image may be captured by an RGB camera, while the given depth image may be captured by a ToF camera. In yet other implementations, the given colour image is captured using at least one visible-light camera, and the given depth image is generated (for example, by the at least one server) using one of:

- stereo disparity between a stereo pair of visible-light images captured by the at least one visible-light camera,
- a 3D model of the given real-world environment and a viewpoint of the at least one camera, the 3D model being a data structure comprising comprehensive information pertaining to the 3D space of the given real-world environment.

It will be appreciated that the given depth image could also be generated using at least one of: depth from focus, depth from reflectance, depth from shading, when the at least one camera has at least one of: a coded aperture, a sensor chip having phase detection autofocus (PDAF) pixels, a sensor chip in which some of its pixels are IR pixels.

Such IR pixels can detect, for example, a structured light at an active-IR illumination. It will also be appreciated that the given depth image could be generated even without using the depth camera. In this regard, the given depth image could be generated by using a monocular depth estimation technique, wherein a single (monocular) RGB image is used for estimating depth values to generate the given depth image.

Optionally, a given depth image is generated using fusion. In this regard, when a sequence of depth images are captured by the at least one camera from a same viewpoint (by assuming that only static objects are present in the given real-world environment), an optical depth of points on a surface of a given static object can be determined as a running average of optical depths of those points represented in the sequence of depth images. It is to be understood that when capturing the sequence of depth images from the same viewpoint, a distance and a relative pose between the given static object and the at least one camera remain constant (i.e., unchanged).

Optionally, the device comprising the at least one camera further comprises tracking means for tracking viewpoints of the at least one camera. It will be appreciated that the tracking means could be implemented as at least one of: an optics-based tracking system (which utilizes, for example, infrared beacons and detectors, IR cameras, visible-light cameras, detectable objects and detectors, and the like), an acoustics-based tracking system, a radio-based tracking system, a magnetism-based tracking system, an accelerometer, a gyroscope, an Inertial Measurement Unit (IMU), a Timing and Inertial Measurement Unit (TIMU). As an example, a detectable object may be an active infra-red (IR) LED, a visible LED, a laser illuminator, a Quick Response (QR) code, an ArUco marker, an anchor marker, a Radio Frequency Identification (RFID) marker, and the like. A detector may be implemented as at least one of: an IR camera, an IR transceiver, a visible-light camera, an RFID reader. The tracking means could be implemented as an internal component of the device, as a tracking system external to the device, or as a combination thereof. Optionally, a processor of the device is configured to process tracking data, collected by the tracking means, for tracking the viewpoints of the at least one camera. The tracking means may employ an outside-in tracking technique, an inside-out tracking technique, or a combination of both the aforesaid techniques, for collecting the tracking data. The tracking data may be in form of images, IMU/TIMU values, motion sensor data values, magnetic field strength values, or similar.

Optionally, the at least one camera is arranged on the device present in the given real-world environment. Such a device could be arranged at a fixed location within the given real-world environment. Optionally, in such a case, the device is stationary in the given real-world environment. Additionally or alternatively, the device could be a wearable device being worn by the given user present in the given real-world environment. In such a case, a location of the device changes with a change in a location of its user. Likewise, the device could be arranged on, for example, a drone, a robot, or similar. As an example, the device could be arranged on a support structure that is capable of a 3D rotation (and additionally, capable of a translation motion). The support structure can be moved to any required location in the given real-world environment. In some implementations, a plurality of such devices may employ peer-to-peer (P2P) computing for implementing the aforementioned method of the present disclosure.

Beneficially, the at least one camera is movable in the given real-world environment, so as to capture the plurality of colour images and the plurality of depth images from a plurality of viewpoints. In this regard, a pose of the at least one camera changes, i.e., at least an orientation of the at least one camera changes with respect to time. It will be appreciated that at least the orientation of the at least one camera may be adjusted (namely, changed) by using a motorised actuator. In such a case, information pertaining to at least the orientation of the at least one camera can be accurately known to the at least one server. The actuator may be driven by an actuation signal, for example, such as a piezoelectric force, an electromagnetic force, a mechanical torque, an electric current, or similar. Notably, different poses of the at least one camera serve as different (known) viewpoints for capturing the plurality of colour images and the plurality of depth images. The term "pose" encompasses both a position and an orientation. A 3D orientation of a given viewpoint corresponds to a direction of a depth axis of a given image from a 3D position of the at least one camera.

Optionally, the at least one server is configured to divide the 3D space into the 3D grid of voxels using a space partitioning scheme. Examples of the space partitioning scheme include, but are not limited to, an Octree (including a Sparse Voxel Octree) Partitioning scheme, a Binary Space Partitioning (BSP) scheme, a Quadtree Partitioning scheme, a k-dimensional tree partitioning scheme, a bounding volume hierarchy (BVH) partitioning scheme, and a voxel hashing scheme. The 3D grid of voxels enables in effectively modelling the 3D space of the given real-world environment. The technical benefit of representing the 3D grid in the given coordinate system is that a location of the given voxel in the 3D grid can be easily identified by the at least one server. It will be appreciated that the 3D grid of voxels may be a regular 3D grid or an irregular 3D grid. However, the regular 3D grid is relatively easier to employ as compared to the irregular 3D grid because tessellation of the regular 3D grid is regular. Examples of the at least one 3D data structure have already been described earlier, and creating the at least one 3D data structure is well-known in the art.

Optionally, the given colour image and the given depth image are divided into the plurality of colour tiles and the plurality of depth tiles, respectively, in a manner that a number of colour tiles is equal to a number of depth tiles. In other words, a grid of colour tiles of the given colour image exactly matches with a grid of depth tiles of the given depth image both in a horizontal direction and a vertical direction. In this regard, colour information represented in the given colour tile and depth information represented in the given depth tile correspond to a same real-world region of the given real-world environment. Optionally, when dividing the given colour image and the given depth image, the at least one server is configured to employ at least image processing algorithm. Optionally, the at least image processing algorithm is at least one of: an image slicing algorithm, an image cropping algorithm, an image segmentation algorithm.

Further, optionally, when mapping the given colour tile to the given voxel, the given voxel is associated with (namely, linked to) the given colour tile as the colour information of the given voxel is captured in the given colour tile. Since optical depths (i.e., the depth information) in the corresponding depth tile of the given depth image and (a 3D position and an orientation of) the given viewpoint are known, the at least one server can easily and accurately ascertain the given voxel in the 3D grid to which the given colour tile is to be mapped. Therefore, the at least one server ascertains a location of the given voxel in the 3D grid whose colour information is captured in the given colour tile. In this regard, at least one of: coordinate geometry-based formula, trigonometry-based formula, is employed for determining the location of the given voxel in the 3D grid.

Upon mapping the given colour tile to the given voxel, the given node of the at least one 3D data structure is populated with the given viewpoint information corresponding to the given colour image and the given depth image, and with any of: the reference information, or the given colour tile and the corresponding depth tile. In some implementations, the given node does not actually store the given colour tile and the given depth tile, but instead stores only the reference information, which provides a unique identification of the given colour tile and the given depth tile. Beneficially, this facilitates in potentially saving space at the at least one data repository whereat the at least one 3D data structure is stored (in form of the at least one 3D model). Moreover, image reconstruction using the at least one 3D data structure can be performed in acceptably accurate manner in real time or near-real time, and in a bandwidth-efficient manner. Furthermore, storing the viewpoint information is also beneficial since the viewpoint information is utilized for selecting at least one colour tile and at least one depth tile at a time of training the at least one neural network using the at least one 3D data structure.

Optionally, in the method, the step of obtaining the at least one neural network comprises utilising the at least one 3D data structure for training the at least one neural network. In this regard, since nodes of the at least one 3D data structure comprise the viewpoint information corresponding to the given colour image and the given depth image along with any of: the reference information, or the colour tiles and the depth tiles, the at least one 3D data structure is served as a training dataset to the at least one neural network. This is because the at least one 3D data structure comprises comprehensive information pertaining to the 3D space of the given real-world environment. During the aforesaid training, the at least one neural network learns from the comprehensive information in the at least one 3D data structure in order to be able to map the given input (namely, the information indicative of the 3D position of the given point) to the given output (namely, the colour and the opacity of the given point). Neural networks and their training is well-known in the art. There will now be discussed in detail on how the at least one 3D data structure is utilised for training the at least one neural network.

In an embodiment, in the method, the step of utilising the at least one 3D data structure for training the at least one neural network comprises:
  processing depth information in depth tiles of the plurality of nodes of the at least one 3D data structure, based on respective viewpoints from which corresponding depth images are captured, to generate a 3D depth model of the given real-world environment;
  determining, from the 3D depth model, an optical depth of a given pixel corresponding to a given ray from a 3D position of a given viewpoint, based on a direction of the given ray;
  selecting a lower bound and an upper bound for the given ray, based on the determined optical depth of the given pixel; and
  during training of the at least one neural network:
    marching the given ray within the lower bound and the upper bound, or
    forcing an opacity function of the at least one neural network to return a zero value for any sample point on the given ray before the lower bound.

Optionally, when processing the depth information to generate the 3D depth model, the at least one server is configured to employ at least one data processing algorithm. The at least one data processing algorithm could be at least one of: a feature extraction algorithm, an image stitching algorithm, an image merging algorithm, an interpolation algorithm, a 3D modelling algorithm, a photogrammetry algorithm, an image blending algorithm. Such data processing algorithms are well-known in the art. Optionally, the 3D depth model is in form of at least one of: a 3D point cloud, a 3D polygonal mesh, a 3D surface cloud, a voxel-based model. The 3D polygonal mesh could, for example, be a 3D triangular mesh or a 3D quadrilateral mesh. It will be appreciated that the 3D depth model stores only 3D positions of points in the given real-world environment, i.e., no colour information of said point is stored in the 3D depth model.

It will be appreciated that the depth information in the depth tiles is processed based on the respective viewpoints to enable the at least one server to utilize the optical depths of the objects or their parts when generating the 3D depth model. In such a case, the 3D depth model is accurately and realistically generated, because information pertaining to the optical depths in the given real-world environment is accurately known, to the at least one server, in detail from various perspectives of the at least one camera that captured the depth images. Thus, the 3D depth model would also be indicative of placements, geometries, occlusions, and the like, of the objects or their parts from said various perspectives.

Since 3D positions of points in the given real-world environment are known from the 3D depth model and the 3D position of the given viewpoint (namely, a 3D position of the at least one camera) is also known, the optical depth of the given pixel can be easily and accurately determined by finding a given point that lies on the given ray and that is nearest to the 3D position of the given viewpoint. In such a case, it is assumed that the given ray originates from the given viewpoint.

It will be appreciated that a (single) given colour image has multiple rays (corresponding to respective pixels of the given colour image) whose directions are different from each other, because said multiple rays span across an entire field of view of the at least one camera. In other words, the given ray for the given pixel corresponds to a direction pointing from the 3D position of the given viewpoint towards the corresponding point that is represented by the given pixel. Optionally, the at least one server is configured to determine the direction of the given ray for the given pixel, based on the 3D position of the given viewpoint, at least one intrinsic parameter of the at least one camera, and pixel coordinates of the given pixel in the given image. Beneficially, for each pixel in the given image, a direction of a corresponding ray can be determined easily and accurately, and thus there would not be any need to store additional ray direction information in the given node of the at least one 3D data structure. The at least one intrinsic parameter of the at least one camera could, for example, comprise at least one of: the field of view, a focal length, an aperture, a resolution, of the at least one camera.

Once the optical depth of the given pixel is determined, the given ray, for example, is to be marched in between two particular bounds (namely, two particular limits) for training the at least one neural network. In this regard, the lower bound and the upper bound for the given ray are selected according to the determined optical depth of the given pixel. For example, the lower bound may be equal to a value lesser than the determined optical depth by a predefined percentage, whereas the upper bound may be equal to a value greater than the determined optical depth by the predefined percentage. Such a predefined percentage may, for example, be defined by taking into account error margins in the depth information, as described later.

In one case, the lower bound and the upper bound define a distance between which the given ray is to be marched for training the at least one neural network. In other words, the given ray is marched through voxels in the 3D grid that lie on a path of the given ray. Thus, the colour and the opacity of the given point (in the given real-world environment) that lies on the given ray can be known to the at least one server from node(s) (of the at least one 3D data structure) in which any of: colour tiles and depth tiles, or reference information corresponding to said voxel(s) are stored. Ray marching is well-known in the art. It will be appreciated that such a ray marching is typically performed at a granularity level of the at least one neural network that is considerably finer than a granularity level of the 3D grid. The voxels may, for example, be cubes of 10 centimetres, and may only be employed for indexing visual representation of the colour tiles. A step size for the ray marching may be dependent on an implicit resolution of the at least one neural network. It will be appreciated that instead of performing ray marching for each pixel for an entire length of optical depths, a starting point of the ray marching is truncated to the lower bound for the given ray. Beneficially, the training of the at least one neural network is fast, more accurate, and reliable. Moreover, ray marching for volume rendering performed in this way is relatively simple, easy, and takes lesser time as compared to ray marching for volume rendering performed in the prior art. Moreover, such ray marching also eliminates formation of cloud-like foreground artifacts, that are unavoidable with the prior art.

In another case, the lower bound for the given ray is used for determining an opacity of a given sample point on the given ray to be zero, when the given sample point lies before the lower bound. This is because when the opacity of the given sample point (lying before the lower bound) is non-zero, it means that some density is present at the given sample point (for example, due to some opaque object or its part). Thus, the (currently selected) lower bound is inaccurate and unreliable for training the at least one neural network, and thus may be modified accordingly. Therefore, it is ensured that the opacity function would return the zero value for any sample point on the given ray before the lower bound. The term "opacity function" refers to a mathematical function used for determining the opacity (namely, a density) of the given sample point on the given ray.

Optionally, the lower bound and the upper bound for the given ray are selected, further based on error margins in the depth information. In a case where the depth images are captured using a depth sensor of the at least one camera, it is likely that there could be some error (namely, uncertainty) in the depth information and thus in the (generated) 3D depth model of the given real-world environment. Therefore, in order to take into account such a depth uncertainty, the lower bound is selected by subtracting an error margin from the determined optical depth of the given pixel, while the upper bound is selected by adding an error margin to the determined optical depth of the given pixel. Such an error margin may, for example, be a predefined percentage of the determined optical depth, a fixed depth value (for example, in millimetres, centimetres, or metres), or similar. The error margins depend on specifications of the depth sensor. Beneficially, selecting the lower bound and the upper bound in this manner facilitates in performing any one of the two aforementioned steps during the training of the at least one neural network accurately and reliably. In an example, the determined optical depth of the given pixel may be 10 meters, and an error margin may be 5 percent of the determined optical depth. Thus, the lower bound and the upper bound are selected as 9.5 meters and 10.5 meters, respectively.

Additionally or alternatively, optionally, the lower bound and the upper bound for the given ray are selected, further based on optical depths of neighbouring pixels corresponding to neighbouring rays of the given ray from the 3D position of the given viewpoint. Optionally, the optical depths of the neighbouring pixels are determined from the 3D depth model, based on directions of the neighbouring rays. In this regard, the neighbouring pixels may lie within a predefined threshold angle and/or within a predefined threshold area from (a location of) the given pixel corresponding to the given ray. When two or more objects appear to be in vicinity in the given colour image, but said objects actually have different optical depths, features (such as edges) of said objects may have been misinterpreted by the depth sensor, and thus their optical depths might be erroneously captured in a depth image. Therefore, when the lower bound and the upper bound are selected based on the (determined) optical depths of the neighbouring pixels, marching of the given ray for training the at least one neural network can be performed more accurately and reliably. Resultantly, it can be ensured that the features of said objects are well-recognised by the at least one (trained) neural network, and thus said feature can be well-represented in the given image. In an example, the determined optical depth of the given pixel may be 5 meters, determined optical depths of two neighbouring pixels may be 4 meters and 6 meters, respectively, and an error margin for each pixel may be 0.5 meters. Thus, the lower bound and the upper bound are selected as 3.5 meters and 6.5 meters, respectively. In this example, even when the error margin is not given, the lower bound and the upper bound can still be selected as 4 meters and 6 meters, respectively. It will be appreciated that a range between the lower bound and the upper bound within which the marching is to be performed may be represented as a signed distance field (SDF) instead of a height map. Such an SDF may be stored in each depth tile or in each node of the at least one 3D data structure.

Optionally, the at least one server is configured to factor the upper bound into a loss function employed in the at least one neural network. In this regard, the upper bound is utilised by the loss function even when the lower bound for the given ray is optionally considered to be zero. The upper bound is necessary for accurately determining the colour of the given point, in resource-efficient and time-efficient manner. This is because the marching of the given ray is restricted to the upper bound which otherwise would have been continued indefinitely. Moreover, the phrase "factoring the upper bound into the loss function" simply means that a colour rendering equation employed by the at least one neural network is modified for utilising the selected upper bound. By utilising the selected upper bound, it is intended that losses or errors in colour rendering is minimum. Assuming relatively accurate depth information in the depth tiles, the density evaluated by the at least one neural network must approach unity as the upper bound is reached while marching of the given ray. The term "loss function" refers to a mathematical function used for determining an overall squared error between a ground truth colour of a given point in the given real-world environment and estimated colours of the given point obtained from coarse rendering and fine rendering. The coarse rendering and the fine rendering are well-known in the art.

Notably, the given image is a visual representation of the given real-world environment from the perspective of the given viewpoint (namely, a new viewpoint), said visual representation being generated using the at least one (trained) neural network and the at least one 3D model of the given real-world environment.

In some implementations, when the method is implemented by the at least one server, the at least one server is configured to receive the viewpoint information (indicative of the given viewpoint from the perspective of which the given image is to be generated) from a client device associated with a given user present within the given real-world environment. In other implementations, when the method is implemented by the client device itself, a processor of the client device is configured to receive the viewpoint information from tracking means of the client device, wherein the tracking means is to be employed for tracking the viewpoints of the client device and/or the given user. In both the aforesaid implementations, the client device comprises the tracking means. The tracking means has been already discussed earlier in detail. The client device could be implemented, for example, as an HMD device. It will be appreciated that the given viewpoint could be determined (by the at least one server or the processor of the client device), based on a pose of a head of the given user or of the client device. In this regard, the tracking means is employed to detect and/or follow a pose of the head of the given user or of the client device within the given real-world environment. The term "pose" encompasses a position and/or an orientation. In practice, the tracking means is actually employed to track a pose of the client device; the pose of the head of the given user corresponds to the pose of the client device, as the client device is worn by the given user on his/her head. Optionally, the at least one server or the processor of the client device employs at least one data processing algorithm to process the tracking data, to determine the given viewpoint corresponding to the pose of the head of the given user or of the client device. Examples of the at least one data processing algorithm include a feature detection algorithm, an environment mapping algorithm, a data extrapolation algorithm, and the like.

Throughout the present disclosure, the term "gaze direction" refers to a direction in which the given user is gazing. The gaze direction may be indicated by a gaze vector. In some implementations, when the method is implemented by the at least one server, the at least one server is configured to receive the gaze information from the client device associated with the given user. In other implementations, when the method is implemented by the client device itself, the processor of the client device is configured to receive the gaze information from gaze-tracking means of the client device. In both the aforesaid implementations, the client device comprises the gaze-tracking means. The term "gaze-tracking means" refers to specialized equipment for detecting and/or following a gaze of the given user. The gaze-tracking means could be implemented as contact lenses with sensors, cameras monitoring a position, a size and/or a shape of a pupil of the user's eyes, and the like. Such gaze-tracking means are well-known in the art.

Notably, since the given viewpoint defines a viewing position and a viewing direction from which the given image is to be generated, and the angular width of the field of view defines an extent of an area of the given real-world environment which would be visible in the given image, the at least one server can easily and accurately determine the region of the given real-world environment, for example, by using the at least one 3D model. Optionally, the angular width of the field of view to be covered in the given image lies in a range of 45 degrees to 220 degrees. As an example, the angular width of the field of view may be from 45, 50, 60, 75, 90, 110, 130 or 160 degrees up to 120, 135, 150, 180 or 220 degrees.

Throughout the present disclosure, the term "gaze portion" of the determined region refers to a portion of the determined region that corresponds to the gaze direction of the given user i.e., whereat the gaze of the given user is directed (namely, focused). In other words, the gaze portion is a region-of-focus of the user's gaze (namely, a region-of-interest) within the determined region. Throughout the present disclosure, the term "peripheral portion" of the determined region refers to a remaining portion of the determined region that remains after excluding the gaze portion. It is to be understood that objects lying within the gaze portion are gaze-contingent objects, and such objects are focused onto foveae of the user's eyes, and are resolved to a much greater detail as compared to remaining object(s) present in the peripheral portion (that is, objects lying outside the gaze portion). It will be appreciated that the gaze portion and the peripheral portion are determined dynamically, based on the gaze direction. Such a dynamic manner of determining the gaze portion and the peripheral portion emulates a way in which the given user actively focuses within his/her field of view.

It will also be appreciated that when the user's gaze is directed towards the determined region of the given real-world environment, a gaze direction of a first eye and a gaze direction of a second eye of the given user are different from each other, and both the aforesaid gaze directions typically converge at said region. Therefore, in such a case, the gaze portion can be understood to be a narrower conical portion with its apex at the given viewpoint, while the peripheral portion can be understood to be a portion left between the narrower conical portion and a wider conical portion surrounding the narrower conical portion. Optionally, a shape of a given conical portion (i.e., the narrower conical portion and/or the wider conical region) depends on gaze directions of the first eye and the second eye of the given user. In an example, when the gaze directions of the first eye and the second eye are focused at a centre of the determined region, the given conical region may be in a shape of a right-circular cone. When the gaze directions of the first eye and the second eye are focused on a point towards a given side of the determined region, the given conical region may be in a shape of an oblique cone or an elliptical cone. The given side may be a left side, a right side, a top side, a bottom side, or a corner side, of the determined region.

Optionally, when determining the gaze portion and the peripheral portion of the determined region of the given real-world environment, the at least one server is configured to map the gaze direction of the given user onto the determined region. Thus, the determined region is digitally divided into two portions namely, the gaze portion and the peripheral portion.

Throughout the present disclosure, the term "gaze segment" refers to an image segment of the given image that coincides with the gaze direction of the given user. In other words, the gaze segment represents the image segment of the given image, whereon a focus of the given user lies. The gaze segment of the given image may, for example, be at a centre of the given image, a top-left side of the given image, a bottom-right side of the given image, or similar.

Optionally, the gaze segment has a well-shaped boundary that resembles any of a circle, a polygon, an ellipse, and the like. Alternatively, optionally, the gaze segment has a free-form-shaped boundary i.e., a boundary that does not resemble any specific shape. Optionally, the gaze segment covers a first pre-defined percentage of pixels in the given image, wherein the first pre-defined percentage lies in a range of 10 percent to 60 percent. Optionally, an angular width of a field of view of the gaze segment lies in a range of 5 degrees to 45 degrees.

Notably, the gaze segment of the given image is generated by ray marching for the gaze portion of the determined region. This is because the gaze portion of the determined region comprises the gaze-continent objects, and thus the gaze segment of the given image is to be highly accurately and realistically generated, for which the ray marching is performed using the at least one neural network. In this regard, a colour and an opacity corresponding to each pixel in the gaze segment are to be determined using the at least one (trained) neural network. In other words, colours and opacities of different pixels in the gaze segment corresponding to different rays from a 3D position of a given viewpoint are estimated by the at least one (trained) neural network. There will now be discussed in detail on how the at least one (trained) neural network is utilised to perform the ray marching for generating the gaze segment.

Optionally, in the method, the step of utilising the at least one neural network to ray march for the gaze portion comprises:
  processing depth information in depth tiles of the plurality of nodes of the at least one 3D data structure, based on respective viewpoints from which corresponding depth images are captured, to generate a 3D depth model of the given real-world environment;
  determining, from the 3D depth model, an optical depth of a given pixel corresponding to a given ray from a 3D position of the given viewpoint, based on a direction of the given ray;
  selecting a lower bound and an upper bound for the given ray, based on the determined optical depth of the given pixel; and
  marching the given ray within the lower bound and the upper bound in the gaze portion of the determined region of the given real-world environment, to generate the gaze segment of the given image with the at least one neural network.

The steps of generating the 3D depth model, determining the optical depth of the given pixel corresponding to the given ray, and selecting the lower bound and the upper bound for the given ray are determined in a same way as described earlier. Further, marching of the given ray is performed in order to obtain a colour and an opacity of the given pixel (in the gaze segment) corresponding to the given ray. When different rays originating from the 3D position of the given viewpoint are marched in this manner, colours and opacities of the different pixels (in the gaze segment) corresponding to the different rays can be easily estimated for generating/rendering the gaze segment. Such a ray marching is same as the ray marching that was performed at a time of training the at least one neural network. It will be appreciated that marching of the given ray only needs to be performed within the lower bound and the upper bound i.e., the given ray is marched through voxels lying within the gaze portion of the determined region. Thus, colours and opacities of points (in the gaze portion of the determined region) that lies on the given ray can be known to the at least one server from relevant node(s) (of the at least one 3D data structure). Beneficially, ray marching for volume rendering performed in this way is relatively simple, easy, and takes lesser time as compared to ray marching for volume rendering performed in the prior art. Moreover, such ray marching also eliminates formation of cloud-like foreground artifacts, that are unavoidable with the prior art.

Throughout the present disclosure, the term "peripheral segment" refers to another image segment of the given image that surrounds the gaze segment. The another image segment may, for example, remain after excluding the gaze segment from the given image. Optionally, the peripheral segment comprises a plurality of pixels surrounding the gaze segment. Optionally, the peripheral segment covers a second pre-defined percentage of pixels in the given image. Optionally, the second pre-defined percentage lies in a range of 40 percent to 90 percent. Optionally, an angular width of a field of view of the peripheral segment lies in a range of 15 degrees to 220 degrees.

Notably, the peripheral segment of the given image is generated by using the at least one 3D model, unlike the gaze segment of the given image that is generated using the ray marching. This is because the peripheral portion of the determined region comprises non-gaze-continent objects, and thus the peripheral segment of the given image is to be acceptably accurately generated, for which using the at least one 3D model is sufficient. Furthermore, although a visual quality (for example, in terms of resolution) of a given segment of the given image obtained using the ray marching would be significantly higher as compared to that when the at least one 3D model is used, performing the ray marching (using the at least one neural network) for an entirety of the given image i.e., for both the gaze portion and the peripheral portion of the determined region, would be highly computationally intensive and time consuming. Moreover, while the given user views the given image, the given user typically does not focus on an entirety of the given image, but rather the focus of the given user is fixed on the gaze segment. Typically, a visual quality of the gaze segment needs to be significantly higher in comparison to the peripheral segment. Therefore, in this regard, the ray marching using the at least one (trained) neural network is only performed for the gaze portion, and the peripheral portion is generated using the at least one 3D model. An image quality of the given image so generated emulates image viewing quality and characteristics of human visual system. In particular, the given image has a spatially variable resolution, wherein the gaze segment of the given image has a first resolution that is higher than a second resolution of the peripheral segment of the given image. This emulates a foveation effect of the human visual system in the given image. Optionally, the given image is to be displayed at the client device/the device, using at least one light source. Optionally, the at least one light source is implemented as a display or a projector. Displays and projectors are well-known in the art.

Optionally, when the at least one 3D model is in the form of the at least one 3D data structure comprising the plurality of nodes, and the at least one 3D model is utilised to generate the peripheral segment of the given image, the at least one server is configured to:
  determine a set of visible nodes whose corresponding voxels, lying within the peripheral portion of the determined region of the given real-world environment, are visible from the given viewpoint;
  for a given visible node of said set, selecting, from amongst colour tiles and depth tiles whose respective reference information is stored in the given visible node, at least one colour tile and at least one corresponding depth tile whose corresponding viewpoint matches the given viewpoint most closely; and reconstruct the peripheral segment of the given image from colour tiles that are selected for each visible node of said set by reprojecting said colour tiles to match the given viewpoint, based on corresponding depth tiles that are selected therefor.

In this regard, the set of visible nodes could be determined as nodes which lie along a viewing direction defining the perspective from the given viewpoint, and whose voxels lie within the peripheral portion of the determined region. Optionally, the set of visible nodes comprises at least one node.

When the viewpoint of the at least one (selected) colour tile (and the at least one corresponding depth tile) of the given visible node is different from the given viewpoint, there would be some offset/skewness in the at least one (selected) colour tile (and the at least one corresponding depth tile) from the perspective of the given viewpoint. In such a case, the at least one server is configured to reproject (namely, warp) the at least one (selected) colour tile and the at least one corresponding depth tile to match the perspective of the given viewpoint, according to a difference between the viewpoint of the at least one (selected) colour tile and the given viewpoint. Optionally, when reprojecting the colour tiles, the at least one server is configured to employ at least one image reprojection algorithm. Optionally, the at least one image reprojection algorithm is at least one of: a space-warping algorithm, a perspective distortion correction algorithm. The at least one image reprojection algorithm may take into account a plurality of factors for generating the peripheral segment of the given image. The plurality of factors comprise, for example, a resolution of a light source whereat the given image is to be displayed, a frame rate of displaying a sequence of generated images, and the like. Image reprojection algorithms are well-known in the art.

It will be appreciated that selection of the at least one colour tile and the at least one corresponding depth tile that are to be used for the aforesaid reconstruction is optionally made based on how well the corresponding viewpoint matches the given viewpoint. If an exact match does not occur, a next-best match is considered, and so on. This is done because a colour tile (and its corresponding depth tile) representing one view that is close-but-not-quite to that of the (requested) given viewpoint might have occluded areas (due to orthographic projection or difference in perspectives) that are captured in other colour tiles (and their corresponding depth tiles) representing other views. Therefore, all the colour tiles and the depth tiles whose respective reference information is stored in the given visible node are checked for closest matching, as described above.

In an embodiment, the method further comprises:
determining an intermediate portion of the determined region of the given real-world environment, based on the gaze direction of the given user, wherein the intermediate portion lies between the gaze portion and the peripheral portion;
utilising the at least one 3D model of the given real-world environment, to generate an intermediate segment of the given image that corresponds to the intermediate portion of the determined region of the given real-world environment; and
inpainting missing pixels in the intermediate segment of the given image, by utilising the at least one neural network.

In this regard, there may be an instance when a difference between the visual quality of the gaze segment of the given image and the visual quality of the peripheral segment of the given image is considerably drastic (namely, too abrupt). Thus, in such instances, a transition (namely, a boundary) between the two aforesaid segments of the given image may be clearly recognizable (namely, perceivable) by the given user when the given image is displayed to the given user, and a viewing experience of the given user would be unrealistic and non-immersive.

Therefore, in order to circumvent this potential problem, the intermediate portion of the determined region of the given real-world environment is optionally determined in between the gaze portion and the peripheral portion. The intermediate portion may be understood to be an intermediate conical portion that is sandwiched between the narrower conical portion (representing the gaze portion) and the wider conical portion (representing the peripheral portion).

Furthermore, the intermediate segment is generated using the at least one 3D model in a similar manner as the peripheral segment is generated, as discussed below. Upon said generation, unlike the peripheral segment, the intermediate segment is refined (namely, fine-tuned) by inpainting its missing pixels using the at least one neural network. Due to this, a visual quality of the intermediate segment is considerably higher as compared to the peripheral segment. Advantageously, in such a case, the intermediate segment provides a smooth transition (namely, gradual blending or fusion) between the gaze segment and the peripheral segment, and thus the gaze segment would appear to be well-blended with the peripheral segment. This improves immersiveness and realism of user's viewing experience when the given image is presented to the given user.

It is to be understood that the intermediate segment lies in between the gaze segment and the peripheral segment of the given image. Optionally, a width of the intermediate segment lies in a range of 1 pixel to 300 pixels. More optionally, a width of the intermediate segment lies in a range of 1 pixel to 200 pixels. Yet more optionally, a width of the intermediate segment lies in a range of 1 pixel to 100 pixels. It will be appreciated that alternatively, the width of the intermediate region may be expressed in terms of degrees, for example, lying in a range of 1 degree to 15 degrees.

Optionally, when the at least one 3D model is in the form of the at least one 3D data structure comprising the plurality of nodes, and the at least one 3D model is utilised to generate the intermediate segment of the given image, the at least one server is configured to:
determine a set of visible nodes whose corresponding voxels, lying within the intermediate portion of the determined region of the given real-world environment, are visible from the given viewpoint;
for a given visible node of said set, selecting, from amongst colour tiles and depth tiles whose respective reference information is stored in the given visible node, at least one colour tile and at least one corresponding depth tile whose corresponding viewpoint matches the given viewpoint most closely; and
reconstruct the intermediate segment of the given image from colour tiles that are selected for each visible node of said set by reprojecting said colour tiles to match the given viewpoint, based on corresponding depth tiles that are selected therefor.

Furthermore, upon the aforesaid reconstruction/generation of the intermediate segment, there may be some (missing) pixels in the intermediate segment whose pixel values are unavailable i.e., empty pixels which do not represent any visual information. This may particularly occur when image reprojection is performed during the aforesaid reconstruction/generation, or when the at least one 3D model is of low quality (i.e., less accurate and less comprehensive), for example, when the at least one 3D model is in a form of a coarse-textured 3D mesh or a sparse 3D point cloud. For example, the intermediate segment may have missing pixels when colour tiles representing an object that is partially occluded in all the colour tiles are reprojected to match the given viewpoint from a perspective which an entirety of said object is visible (i.e., said is non-occluded). In such a case, the missing pixels are optionally inpainted using the at least one neural network. Beneficially, upon inpainting, an entirety of the intermediate region appears to be acceptably accurate and realistic. The "inpainting" is a specialized process of reconstructing damaged, missing, or un-read pixel values of some pixels by using pixel values available from other neighbouring pixels. The inpainting process and algorithms/technique for inpainting using the at least one neural network are well-known in the art. It will be appreciated that the inpainting could be performed using an artificial intelligence (AI) algorithm, a Fast Marching Method (FMM) algorithm, a Navier Stokes (NS) based inpainting algorithm, a coherence transport based inpainting algorithm, an exemplar-based inpainting algorithm, Criminisi's algorithm, a group-based sparse representation (GSR) algorithm, a compression-oriented edge-based inpainting algorithm, an annihilating filter-based low-rank Hankel matrix approach (ALOHA) algorithm, an image melding using patch-based synthesis algorithm. One such way of performing the interpolation is described, for example, in "*Filling holes in 3D scanned model base on 2D image inpainting*" by Shu-Chin Lin et al., published in 10th International Conference on Ubi-media Computing and Workshops (Ubi-Media), pp 1-6, 2017, which has been incorporated herein by reference. It will also be appreciated that, for the at least one neural network, performing the inpainting in addition to utilising the at least one 3D model would be less computationally-intensive and less time-consuming, as compared to performing the ray marching.

Optionally, in the method, when generating the intermediate segment of the given image, a ratio of a density of pixels generated by utilising the at least one neural network and a density of pixels generated by utilising the at least one 3D model decreases on going away from the gaze portion. In this regard, a greater number of pixels in the intermediate segment that lie near the gaze segment, are generated (i.e., inpainted) by utilising the at least one neural network, whereas a greater number of pixels in the intermediate segment that lie far from the gaze segment, are generated only by utilising the at least one 3D model (i.e., no inpainting is performed for such pixels). In such a case, the ratio would be 1 at a boundary between the gaze segment and the intermediate segment, and then gradually decreases to zero at a boundary between the peripheral segment and the intermediate segment. Thus, a visual quality of the intermediate segment gradually decreases on going away from the gaze segment towards the peripheral segment, said visual quality being higher towards the boundary between the gaze segment and the intermediate segment (and being similar to the visual quality of the gaze segment), and said visual quality being lower towards the boundary between the peripheral segment and the intermediate segment (and being similar to the visual quality of the peripheral segment). Advantageously, in such a case, the intermediate segment provides a smooth/seamless transition between the gaze segment and the peripheral segment. In other words, by generating the intermediate segment, a smooth imperceptible transition is provided between the gaze segment and the peripheral segment of the given image, as the gaze segment would appear to be well-blended with the peripheral segment. This improves immersiveness and realism of user's viewing experience when the given image is presented to the given user. It will be appreciated that the aforesaid ratio could decrease in a step-wise manner, a linear manner, or a non-linear manner, on going away from the gaze portion.

Optionally, the method further comprises inpainting missing pixels in the peripheral segment of the given image, by utilising the at least one neural network. In this regard, upon reconstructing/generating the peripheral segment (as discussed earlier), there may be some (missing) pixels in the peripheral segment whose pixel values are unavailable i.e., empty pixels which do not represent any visual information. This may particularly occur due to the aforementioned reasons. Therefore, in such a case, the missing pixels in the peripheral segment are inpainted using the at least one neural network in a similar manner as the missing pixels in the intermediate segment are inpainted. Beneficially, upon inpainting, an entirety of the peripheral region appears to be acceptably accurate and realistic. However, in interest of minimizing utilisation of processing resources and processing time of the at least one server, it is not necessary to perform the inpainting in the peripheral segment as it does not correspond to the user's gaze.

In another embodiment, the method further comprises:
determining an intermediate portion of the determined region of the given real-world environment, based on the gaze direction of the given user, wherein the intermediate portion lies between the gaze portion and the peripheral portion; and
utilising the at least one neural network to ray march for the intermediate portion of the determined region of the given real-world environment, to generate an intermediate segment of the given image that corresponds to the intermediate portion of the determined region of the given real-world environment, wherein the intermediate segment is generated using at least one of: a coarser step size for ray marching, a lower pixel resolution than the gaze segment.

In this regard, the intermediate portion of the determined region is determined in a same manner as described earlier (in the previous embodiment). Moreover, when the at least one neural network is utilised for ray marching for the intermediate portion, a colour and an opacity corresponding to each pixel in the intermediate segment are to be determined using the at least one (trained) neural network. In other words, colours and opacities of different pixels in the intermediate segment corresponding to different rays from the 3D position of the given viewpoint are estimated by the at least one (trained) neural network. It will be appreciated that the ray marching for the intermediate portion is performed in a similar manner as that for the gaze portion, as discussed earlier. However, when the ray marching is to be performed for the intermediate portion, a coarser step size is used as compared to a step size that would be used in the ray marching for the gaze portion. The term "step size" refers to a marching distance covered by the given ray in each step in the direction of the given ray, namely, a distance between two adjacent sample points lying along the given ray. Typically, greater the step size (namely, coarser the step size) for the ray marching, greater is the distance between two consecutive sample points lying on the given ray, and vice versa. Moreover, a greater step size for the ray marching would result in a lesser rendering time, and in generating an image having a relatively lower visual quality (for example, only acceptable visual quality). Conversely, a smaller step size for the ray marching would result in a relatively higher rendering time, but in generating an image having significantly higher visual quality. Therefore, the smaller step size may be suitable to be used for generating the gaze segment of the given image, whereas the greater step size may be suitable to be used for generating the intermediate segment. The step size in the ray marching is well-known in the art.

Since the intermediate portion does not correspond to the gaze direction of the given user, the intermediate segment need not be highly accurately and realistically generated like the gaze segment. Thus, using even the coarser step size for generating the intermediate segment would result in achieving acceptably high visual quality in the intermediate segment. When using the coarser step size, sample points on the given ray are sparsely located from each other. In such a case, the sample points could be equi-distant, irrespective of densities in a path of the given ray. Similarly, the intermediate segment can be generated using the lower pixel resolution than the gaze segment, and would still result in achieving acceptably high visual quality in the intermediate segment. Optionally, a pixel resolution to be used for generating the intermediate segment lies in a range of 1/16 to 1/2 of a pixel resolution of the gaze segment. Moreover, in this manner, utilisation of processing resources and processing time of the at least one server are considerably reduced, since different segments of the given image require different extents of processing.

Optionally, when generating the intermediate segment of the given image, a step size for ray marching increases on going away from the gaze portion. In this regard, a smaller step size (i.e., a finer step size) is used for ray marching near the gaze portion for generating pixels in the intermediate segment that would lie near the gaze segment, whereas a greater step size (i.e., a coarser step size) is used for ray marching far from the gaze portion for generating pixels in the intermediate segment that would lie far from the gaze segment. Thus, the visual quality of the intermediate segment gradually decreases on going away from the gaze segment towards the peripheral segment, as discussed earlier. Advantageously, in such a case, the intermediate segment provides a smooth/seamless imperceptible transition between the gaze segment and the peripheral segment, as the gaze segment would appear to be well-blended with the peripheral segment. This improves immersiveness and realism of user's viewing experience when the given image is presented to the given user. It will be appreciated that the step size could increase in a step-wise manner, a linear manner, or a non-linear manner, on going away from the gaze portion.

The present disclosure also relates to the system and the computer program product as described above. Various embodiments and variants disclosed above, with respect to the aforementioned first aspect, apply mutatis mutandis to the system and the computer program product.

Optionally, in the system, the at least one 3D model is in a form of at least one 3D data structure comprising a plurality of nodes, each node representing a corresponding voxel of a 3D grid of voxels into which a 3D space occupied by the given real-world environment is divided, wherein a given node of the at least one 3D data structure stores given viewpoint information indicative of a given viewpoint from which a given colour image and a given depth image are captured, along with any of:
 (i) a given colour tile of the given colour image that captures colour information of a given voxel repre-
sented by the given node and a corresponding depth tile of the given depth image that captures depth information of the given voxel from a perspective of the given viewpoint,
 (ii) reference information indicative of unique identification of the given colour tile and the corresponding depth tile.

Optionally, when obtaining the at least one 3D model, the at least one server is configured to:
receive a plurality of colour images of the given real-world environment, a plurality of depth images corresponding to the plurality of colour images, and viewpoint information indicative of corresponding viewpoints from which the plurality of colour images and the plurality of depth images are captured, wherein 3D positions and orientations of the viewpoints are represented in a given coordinate system;
divide the 3D space occupied by the given real-world environment into the 3D grid of voxels, wherein the 3D grid is represented in the given coordinate system;
create the at least one 3D data structure;
divide the given colour image and the given depth image into a plurality of colour tiles and a plurality of depth tiles, respectively, wherein the plurality of depth tiles correspond to respective ones of the plurality of colour tiles;
map the given colour tile of the given colour image to the given voxel in the 3D grid whose colour information is captured in the given colour tile, based on the given viewpoint and the depth information captured in the corresponding depth tile of the given depth image; and
store, in the given node of the at least one 3D data structure that represents the given voxel, the given viewpoint information indicative of the given viewpoint, along with any of: (i) the given colour tile and the corresponding depth tile, (ii) the reference information.

Optionally, when obtaining the at least one neural network, the at least one server is configured to utilise the at least one 3D data structure for training the at least one neural network.

Optionally, when utilising the at least one 3D data structure for training the at least one neural network, the at least one server is configured to:
process depth information in depth tiles of the plurality of nodes of the at least one 3D data structure, based on respective viewpoints from which corresponding depth images are captured, to generate a 3D depth model of the given real-world environment;
determine, from the 3D depth model, an optical depth of a given pixel corresponding to a given ray from a 3D position of a given viewpoint, based on a direction of the given ray;
select a lower bound and an upper bound for the given ray, based on the determined optical depth of the given pixel; and
during training of the at least one neural network:
 march the given ray within the lower bound and the upper bound, or
 force an opacity function of the at least one neural network to return a zero value for any sample point on the given ray before the lower bound.

Optionally, when utilising the at least one neural network to ray march for the gaze portion, the at least one server is configured to:
process depth information in depth tiles of the plurality of nodes of the at least one 3D data structure, based on respective viewpoints from which corresponding depth images are captured, to generate a 3D depth model of the given real-world environment;

determine, from the 3D depth model, an optical depth of a given pixel corresponding to a given ray from a 3D position of the given viewpoint, based on a direction of the given ray;

select a lower bound and an upper bound for the given ray, based on the determined optical depth of the given pixel; and march the given ray within the lower bound and the upper bound in the gaze portion of the determined region of the given real-world environment, to generate the gaze segment of the given image with the at least one neural network.

In an embodiment, the at least one server is configured to:

determine an intermediate portion of the determined region of the given real-world environment, based on the gaze direction of the given user, wherein the intermediate portion lies between the gaze portion and the peripheral portion;

utilise the at least one 3D model of the given real-world environment, to generate an intermediate segment of the given image that corresponds to the intermediate portion of the determined region of the given real-world environment; and inpaint missing pixels in the intermediate segment of the given image, by utilising the at least one neural network.

Optionally, the at least one server is configured to inpaint missing pixels in the peripheral segment of the given image, by utilising the at least one neural network.

Optionally, when generating the intermediate segment of the given image, a ratio of a density of pixels generated by utilising the at least one neural network and a density of pixels generated by utilising the at least one 3D model decreases on going away from the gaze portion.

In another embodiment, the at least one server is configured to:

determine an intermediate portion of the determined region of the given real-world environment, based on the gaze direction of the given user, wherein the intermediate portion lies between the gaze portion and the peripheral portion; and utilise the at least one neural network to ray march for the intermediate portion of the determined region of the given real-world environment, to generate an intermediate segment of the given image that corresponds to the intermediate portion of the determined region of the given real-world environment, wherein the intermediate segment is generated using at least one of: a coarser step size for ray marching, a lower pixel resolution than the gaze segment.

Optionally, when generating the intermediate segment of the given image, a step size for ray marching increases on going away from the gaze portion.

DETAILED DESCRIPTION OF THE DRAWINGS

Referring to FIG. 1, illustrated is a block diagram of an architecture of a system 100 incorporating foveated rendering using neural radiance fields or other similar neural networks, in accordance with an embodiment of the present disclosure. The system 100 comprises at least one server (depicted as a server 102) and at least one data repository (depicted as a data repository 104) that is communicably coupled to the server 102. The server 102 is configured to perform various operations, as described earlier in accordance with the aforementioned second aspect.

It may be understood by a person skilled in the art that the FIG. 1 includes a simplified architecture of the system 100 for sake of clarity, which should not unduly limit the scope of the claims herein. It is to be understood that the specific implementation of the system 100 is provided as an example and is not to be construed as limiting it to specific numbers or types of servers and data repositories. The person skilled in the art will recognize many variations, alternatives, and modifications of embodiments of the present disclosure.

Figure 2:
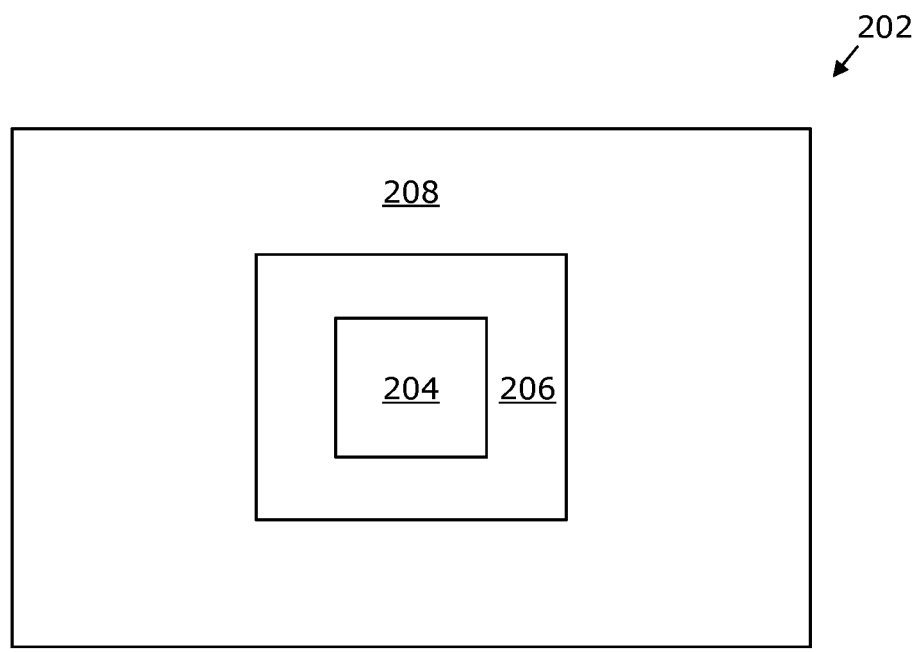
FIG. 2 illustrates different segments of an image generated in different ways, in accordance with an embodiment of the present disclosure.

Referring to FIG. 2, illustrated schematically are different segments of an image 202 generated in different ways, in accordance with an embodiment of the present disclosure. The image 202 comprises a gaze segment 204, (optionally) an intermediate segment 206, and a peripheral segment 208. The intermediate segment 206 lies between the gaze segment 204 and the peripheral segment 208. The gaze segment 204 corresponds to a gaze portion (for example, at a centre) of a region of a real-world environment (not shown) that is represented in the image 202. The gaze portion corresponds to a gaze direction of a user (not shown). The peripheral segment 208 corresponds to a peripheral portion of the region of the real-world environment, wherein the peripheral portion surrounds the gaze portion. The intermediate segment 206 corresponds to an intermediate portion of the region of the real-world environment, wherein the intermediate portion lies between the gaze portion and the peripheral portion of the region of the real-world environment.

The gaze segment 204 is generated by utilising at least one neural network to ray march for the gaze portion. The peripheral segment 208 is generated by utilising at least one 3D model of the real-world environment. In one implementation, the intermediate segment 206 is generated by utilising the at least one 3D model. In another implementation, the intermediate segment 206 is generated by utilising the at least one neural network to ray march for the intermediate portion, wherein the intermediate segment 206 is generated using any one of: a coarser step size for ray marching, a lower pixel resolution than the gaze segment 204.

Figure 3A:
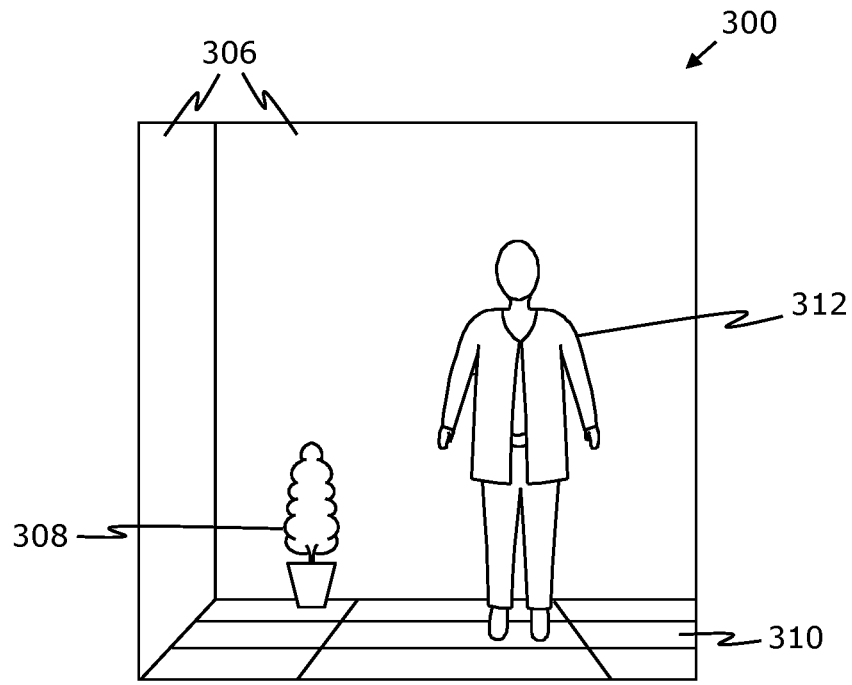
FIG. 3A is a schematic representation of an exemplary colour image of a real-world environment.
Figure 3B:
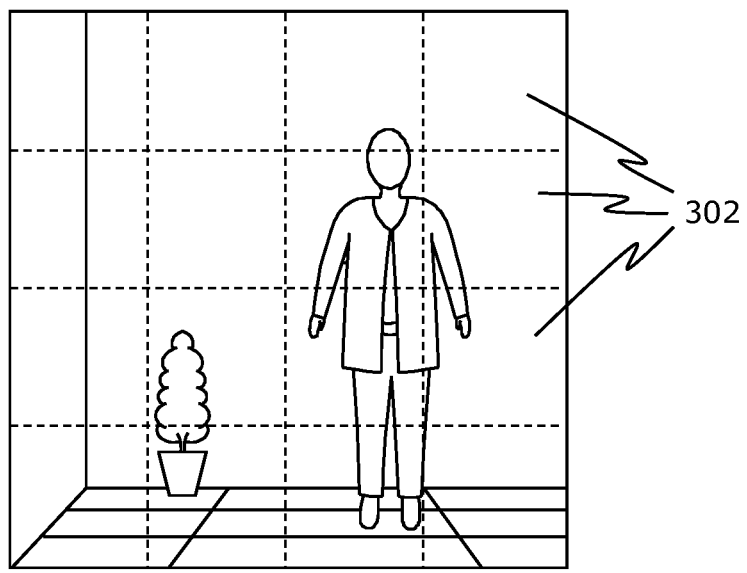
Figure 3C:
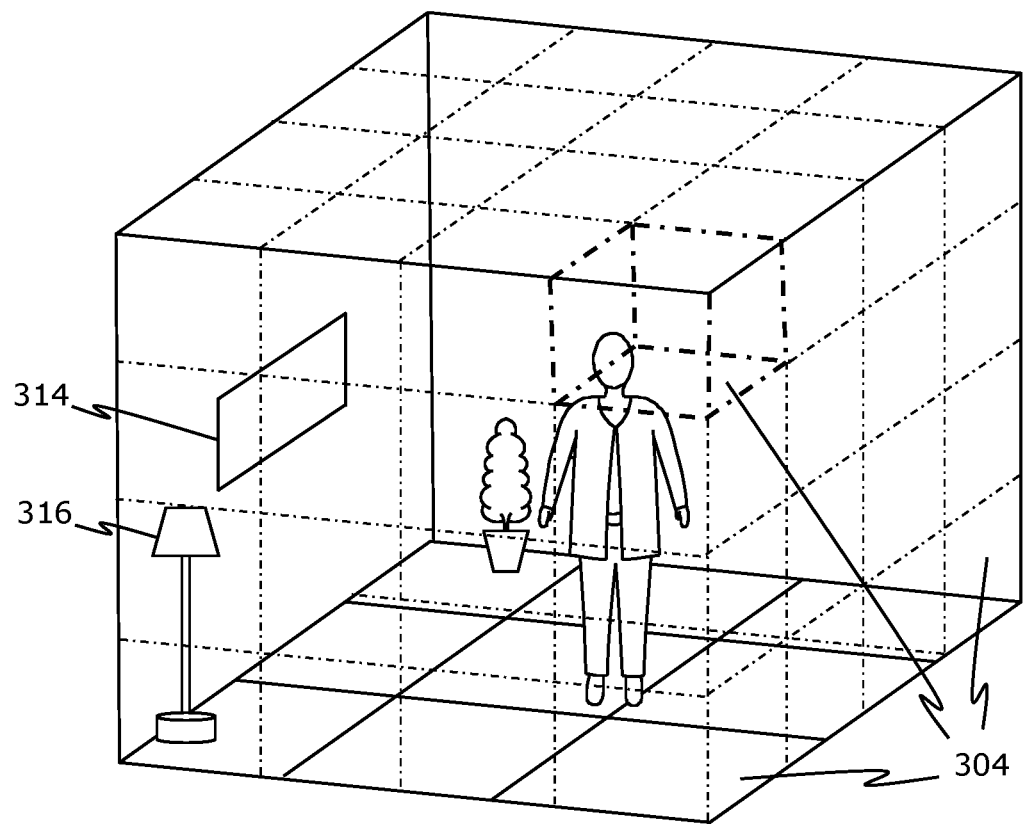
FIG. 3C is a schematic representation of a three-dimensional (3D) space occupied by the real-world environment being divided into a 3D grid of voxels, in accordance with an embodiment of the present disclosure.

Referring to FIGS. 3A, 3B, and 3C, FIG. 3A is a schematic representation of an exemplary colour image 300 of a real-world environment, FIG. 3B is a schematic representation of how the colour image 300 can be divided into a plurality of colour tiles 302, while FIG. 3C is a schematic representation of a three-dimensional (3D) space occupied by the real-world environment being divided into a 3D grid of voxels 304, in accordance with an embodiment of the present disclosure.

With reference to FIG. 3A, the colour image 300 is captured using a camera (not shown) from a particular pose of the camera. The colour image 300 represents a living room in the real-world environment, the living room comprising a plurality of objects 306, 308, 310, 312, 314 and 316, depicted as walls, an indoor plant, a tiled floor, a human, a television and a lamp, respectively.

With reference to FIG. 3B, the colour image 300 is shown to be divided into 16 equi-sized colour tiles 302 (depicted as a 4×4 grid of dashed lines), for sake of simplicity. Similarly, a depth image (not shown) corresponding to the colour image 300 is divided into a plurality of depth tiles, wherein the plurality of depth tiles correspond to respective ones of the plurality of colour tiles 302.

With reference to FIG. 3C, the 3D space represents the living room in the real-world environment. The 3D space is shown to be divided into the 3D grid of 64 equi-sized voxels 304 (depicted as a 4×4×4 3D grid of dash-dot lines). For sake of simplicity, the 3D space is divided into only 64 voxels, and one of the 64 voxels that is located at an upper right corner of the 3D space is shown in a complete 3D form.

Figure 4A:
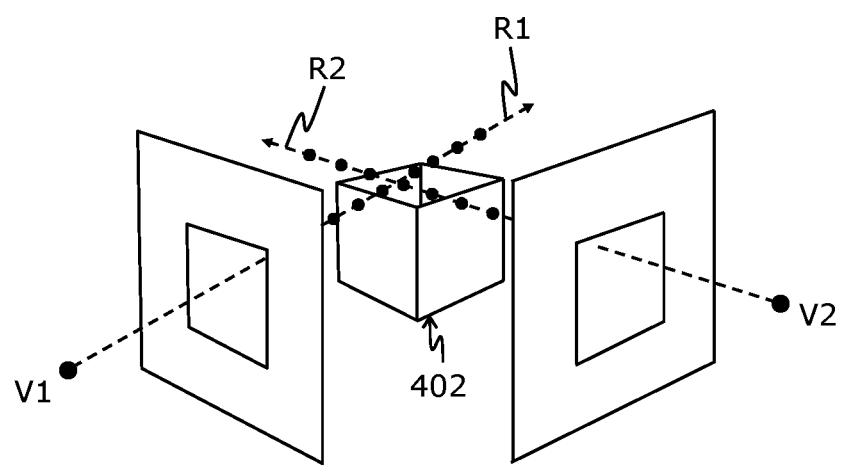
FIGS. 4A and 4B illustrate how marching of a ray is performed during training of a neural network, in accordance with an embodiment of the present disclosure.
Figure 4B:
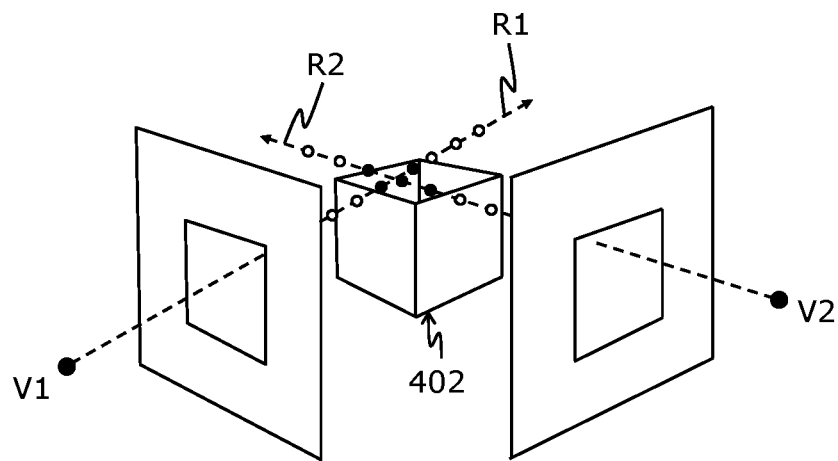

Referring to FIGS. 4A and 4B, illustrated is how marching of a ray is performed during training of a neural network, in accordance with an embodiment of the present disclosure. With reference to FIGS. 4A and 4B, an object 402 present in a real-world environment is being imaged from two different viewpoints V1 and V2 in the real-world environment. Different sample points (for example, depicted as solid black colour dots) are shown to lie on rays R1 and R2 originating from 3D positions of the two different viewpoints V1 and V2, respectively. The different sample points correspond to different 3D positions in the real-world environment.

Referring to FIG. 4B, as shown, some sample points from amongst the different sample points (for example, sample points depicted using solid black colour dots) fall on a surface of the object 402, while other sample points from amongst the different sample points (for example, sample points depicted using hollow dots) fall outside any surface of the object 402. The rays R1 and R2 are marched for the different sample points in order to train the neural network. Upon training, colours and opacities of some sample points (namely, colours and opacities of real-world points corresponding to the different 3D positions) can be determined using the (trained) neural network. Other sample points do not have any colours and opacities. As an example, such sample points may represent empty spaces (around the object 402) in the real-world environment.

Figures 5A, 5B:
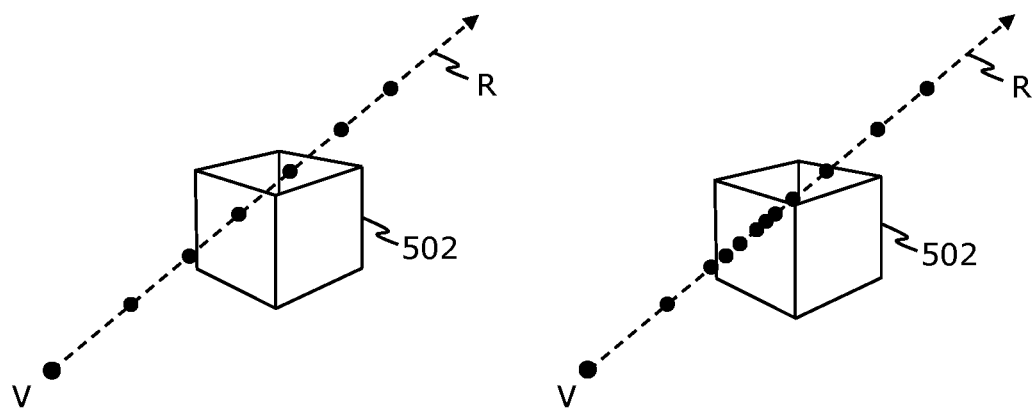
FIGS. 5A and 5B illustrate different exemplary ways of sampling of a ray, in accordance with an embodiment of the present disclosure.

Referring to FIGS. 5A and 5B, illustrated are different exemplary ways of sampling of a ray R, in accordance with an embodiment of the present disclosure. With reference to FIGS. 5A and 5B, an object 502 present in a real-world environment is being imaged from a viewpoint V in the real-world environment. Different sample points (for example, depicted as solid black colour dots) are shown to lie on the ray R originating from a 3D position of the viewpoint V.

Referring to FIG. 5A, the different sample points are chosen in a manner that said sample points are equi-distant from each other for an entirety of the ray R. For example, only 2 sample points out of a total of 6 equi-distant sample points fall on the object 502. Referring to FIG. 4B, the different sample points are chosen based on hierarchical sampling, wherein said sample points are not necessarily equi-distant from each other. Higher number of sample points are chosen for a part of the ray R having a higher density, as compared to a remaining part of the ray R having a relatively lower density. In other words, the part of the ray R that falls on a surface of the object 502 is shown to have greater number of sample points, as compared to the remaining part of the ray R.

FIGS. 2, 3A-3C, 4A-4B, and 5A-5B are merely examples, which should not unduly limit the scope of the claims herein. A person skilled in the art will recognize many variations, alternatives, and modifications of embodiments of the present disclosure. For example, with reference to FIG. 2, the gaze portion of the region of the real-world environment may lie towards any one of: a top side, a bottom side, a right side, a left side, a top-right side, a top-left side, a bottom-right side, a bottom-left side, of said region.

Figure 6:
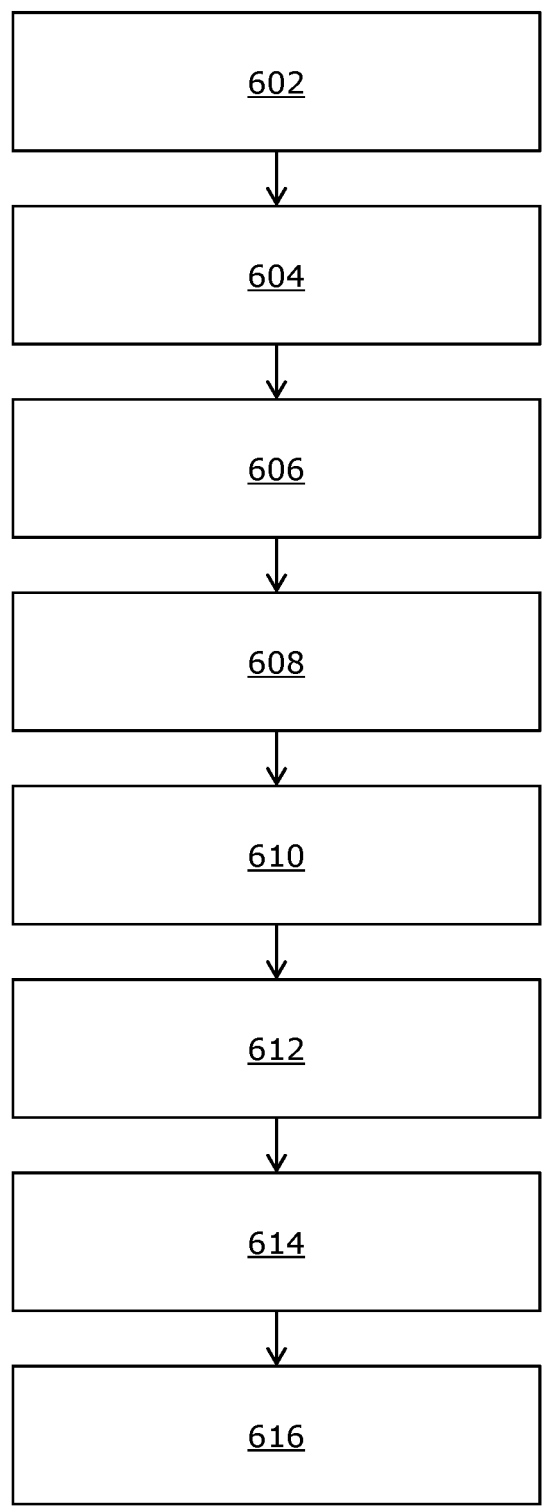
FIG. 6 illustrates steps of a computer-implemented method incorporating foveated rendering using neural radiance fields or other similar neural networks, in accordance with an embodiment of the present disclosure.

Referring to FIG. 6, illustrated are steps of a computer-implemented method incorporating foveated rendering using neural radiance fields or other similar neural networks, in accordance with an embodiment of the present disclosure. At step 602, at least one neural network trained for rendering images of a given real-world environment is obtained, wherein a given input of the at least one neural network comprises information indicative of a three-dimensional (3D) position of a given point in the given real-world environment and a given output of the at least one neural network comprises a colour and an opacity of the given point. At step 604, at least one 3D model of the given real-world environment is obtained. At step 606, viewpoint information indicative of a given viewpoint from a perspective of which a given image is to be generated, is received. At step 608, gaze information indicative of a gaze direction of a given user is received. At step 610, a region of the given real-world environment that is to be represented in the given image is determined, based on the given viewpoint and an angular width of a field of view to be covered in the given image. At step 612, a gaze portion and a peripheral portion of the determined region of the given real-world environment are determined, based on the gaze direction of the given user, wherein the gaze portion corresponds to the gaze direction, while the peripheral portion surrounds the gaze portion. At step 614, the at least one neural network is utilised to ray march for the gaze portion of the determined region of the given real-world environment, to generate a gaze segment of the given image that corresponds to the gaze portion of the determined region of the given real-world environment. At step 616, the at least one 3D model of the given real-world environment is utilised, to generate a peripheral segment of the given image that corresponds to the peripheral portion of the determined region of the given real-world environment.

The aforementioned steps are only illustrative and other alternatives can also be provided where one or more steps are added, one or more steps are removed, or one or more steps are provided in a different sequence without departing from the scope of the claims herein.

The invention claimed is:

1. A computer-implemented method comprising:
    obtaining at least one neural network trained for rendering images of a given real-world environment, wherein a given input of the at least one neural network comprises information indicative of a three-dimensional (3D) position of a given point in the given real-world environment and a given output of the at least one neural network comprises a colour and an opacity of the given point;
    obtaining at least one 3D model of the given real-world environment, wherein the at least one 3D model is in a form of at least one 3D data structure comprising a plurality of nodes, each node representing a corresponding voxel of a 3D grid of voxels into which a 3D space occupied by the given real-world environment is divided, wherein a given node of the at least one 3D data structure stores given viewpoint information indicative of a given viewpoint from which a given colour image and a given depth image are captured, along with any of:
    (i) a given colour tile of the given colour image that captures colour information of a given voxel represented by the given node and a corresponding depth tile of the given depth image that captures depth information of the given voxel from a perspective of the given viewpoint,
    (ii) reference information indicative of unique identification of the given colour tile and the corresponding depth tile;
    receiving viewpoint information indicative of a given viewpoint from a perspective of which a given image is to be generated;

receiving gaze information indicative of a gaze direction of a given user;

determining a region of the given real-world environment that is to be represented in the given image, based on the given viewpoint and an angular width of a field of view to be covered in the given image;

determining a gaze portion and a peripheral portion of the determined region of the given real-world environment, based on the gaze direction of the given user, wherein the gaze portion corresponds to the gaze direction, while the peripheral portion surrounds the gaze portion;

utilising the at least one neural network to ray march for the gaze portion of the determined region of the given real-world environment, to generate a gaze segment of the given image that corresponds to the gaze portion of the determined region of the given real-world environment; and utilising the at least one 3D model of the given real-world environment, to generate a peripheral segment of the given image that corresponds to the peripheral portion of the determined region of the given real-world environment.

2. The computer-implemented method of claim 1, wherein the step of obtaining the at least one 3D model comprises:

receiving a plurality of colour images of the given real-world environment, a plurality of depth images corresponding to the plurality of colour images, and viewpoint information indicative of corresponding viewpoints from which the plurality of colour images and the plurality of depth images are captured, wherein 3D positions and orientations of the viewpoints are represented in a given coordinate system;

dividing the 3D space occupied by the given real-world environment into the 3D grid of voxels, wherein the 3D grid is represented in the given coordinate system;

creating the at least one 3D data structure;

dividing the given colour image and the given depth image into a plurality of colour tiles and a plurality of depth tiles, respectively, wherein the plurality of depth tiles correspond to respective ones of the plurality of colour tiles;

mapping the given colour tile of the given colour image to the given voxel in the 3D grid whose colour information is captured in the given colour tile, based on the given viewpoint and the depth information captured in the corresponding depth tile of the given depth image; and storing, in the given node of the at least one 3D data structure that represents the given voxel, the given viewpoint information indicative of the given viewpoint, along with any of: (i) the given colour tile and the corresponding depth tile, (ii) the reference information.

3. The computer-implemented method of claim 1, wherein the step of obtaining the at least one neural network comprises utilising the at least one 3D data structure for training the at least one neural network.

4. The computer-implemented method of claim 3, wherein the step of utilising the at least one 3D data structure for training the at least one neural network comprises:

processing depth information in depth tiles of the plurality of nodes of the at least one 3D data structure, based on respective viewpoints from which corresponding depth images are captured, to generate a 3D depth model of the given real-world environment;

determining, from the 3D depth model, an optical depth of a given pixel corresponding to a given ray from a 3D position of a given viewpoint, based on a direction of the given ray;

selecting a lower bound and an upper bound for the given ray, based on the determined optical depth of the given pixel; and during training of the at least one neural network:
marching the given ray within the lower bound and the upper bound, or
forcing an opacity function of the at least one neural network to return a zero value for any sample point on the given ray before the lower bound.

5. The computer-implemented method of claim 1, wherein the step of utilising the at least one neural network to ray march for the gaze portion comprises:

processing depth information in depth tiles of the plurality of nodes of the at least one 3D data structure, based on respective viewpoints from which corresponding depth images are captured, to generate a 3D depth model of the given real-world environment;

determining, from the 3D depth model, an optical depth of a given pixel corresponding to a given ray from a 3D position of the given viewpoint, based on a direction of the given ray;

selecting a lower bound and an upper bound for the given ray, based on the determined optical depth of the given pixel; and marching the given ray within the lower bound and the upper bound in the gaze portion of the determined region of the given real-world environment, to generate the gaze segment of the given image with the at least one neural network.

6. The computer-implemented method of claim 1, further comprising:

determining an intermediate portion of the determined region of the given real-world environment, based on the gaze direction of the given user, wherein the intermediate portion lies between the gaze portion and the peripheral portion;

utilising the at least one 3D model of the given real-world environment, to generate an intermediate segment of the given image that corresponds to the intermediate portion of the determined region of the given real-world environment; and inpainting missing pixels in the intermediate segment of the given image, by utilising the at least one neural network.

7. The computer-implemented method of claim 6, further comprising inpainting missing pixels in the peripheral segment of the given image, by utilising the at least one neural network.

8. The computer-implemented method of claim 6, wherein when generating the intermediate segment of the given image, a ratio of a density of pixels generated by utilising the at least one neural network and a density of pixels generated by utilising the at least one 3D model decreases on going away from the gaze portion.

9. The computer-implemented method of claim 1, further comprising:

determining an intermediate portion of the determined region of the given real-world environment, based on the gaze direction of the given user, wherein the intermediate portion lies between the gaze portion and the peripheral portion; and utilising the at least one neural network to ray march for the intermediate portion of the determined region of the given real-world environment, to generate an intermediate segment of the given image that corresponds to the intermediate portion of the determined region of the given real-world environment, wherein the intermediate segment is generated using at least one of: a coarser step size for ray marching, a lower pixel resolution than the gaze segment.

10. The computer-implemented method of claim 9, wherein when generating the intermediate segment of the given image, a step size for ray marching increases on going away from the gaze portion.

11. A computer program product comprising a non-transitory machine-readable data storage medium having stored thereon program instructions that, when executed by a processor, cause the processor to execute steps of a computer-implemented method of claim 1.

12. A system comprising:
at least one data repository; and
at least one server configured to:
obtain at least one neural network that is trained for rendering images of a given real-world environment, wherein a given input of the at least one neural network comprises information indicative of a three-dimensional (3D) position of a given point in the given real-world environment and a given output of the at least one neural network comprises a colour and an opacity of the given point;
obtain at least one 3D model of the given real-world environment, wherein the at least one 3D model is stored at the at least one data repository, wherein the at least one 3D model is in a form of at least one 3D data structure comprising a plurality of nodes, each node representing a corresponding voxel of a 3D grid of voxels into which a 3D space occupied by the given real-world environment is divided, wherein a given node of the at least one 3D data structure stores given viewpoint information indicative of a given viewpoint from which a given colour image and a given depth image are captured, along with any of:
(i) a given colour tile of the given colour image that captures colour information of a given voxel represented by the given node and a corresponding depth tile of the given depth image that captures depth information of the given voxel from a perspective of the given viewpoint,
(ii) reference information indicative of unique identification of the given colour tile and the corresponding depth tile;
receive viewpoint information indicative of a given viewpoint from a perspective of which a given image is to be generated;
receive gaze information indicative of a gaze direction of a given user;
determine a region of the given real-world environment that is to be represented in the given image, based on the given viewpoint and an angular width of a field of view to be covered in the given image;
determine a gaze portion and a peripheral portion of the determined region of the given real-world environment, based on the gaze direction of the given user, wherein the gaze portion corresponds to the gaze direction, while the peripheral portion surrounds the gaze portion;
utilise the at least one neural network to ray march for the gaze portion of the determined region of the given real-world environment, to generate a gaze segment of the given image that corresponds to the gaze portion of the determined region of the given real-world environment; and
utilise the at least one 3D model of the given real-world environment, to generate a peripheral segment of the given image that corresponds to the peripheral portion of the determined region of the given real-world environment.

13. The system of claim 12, wherein when obtaining the at least one 3D model, the at least one server is configured to:
receive a plurality of colour images of the given real-world environment, a plurality of depth images corresponding to the plurality of colour images, and viewpoint information indicative of corresponding viewpoints from which the plurality of colour images and the plurality of depth images are captured, wherein 3D positions and orientations of the viewpoints are represented in a given coordinate system;
divide the 3D space occupied by the given real-world environment into the 3D grid of voxels, wherein the 3D grid is represented in the given coordinate system;
create the at least one 3D data structure;
divide the given colour image and the given depth image into a plurality of colour tiles and a plurality of depth tiles, respectively, wherein the plurality of depth tiles correspond to respective ones of the plurality of colour tiles;
map the given colour tile of the given colour image to the given voxel in the 3D grid whose colour information is captured in the given colour tile, based on the given viewpoint and the depth information captured in the corresponding depth tile of the given depth image; and
store, in the given node of the at least one 3D data structure that represents the given voxel, the given viewpoint information indicative of the given viewpoint, along with any of: (i) the given colour tile and the corresponding depth tile, (ii) the reference information.

14. The system of claim 12, wherein when obtaining the at least one neural network, the at least one server is configured to utilise the at least one 3D data structure for training the at least one neural network.

15. The system of claim 14, wherein when utilising the at least one 3D data structure for training the at least one neural network, the at least one server is configured to:
process depth information in depth tiles of the plurality of nodes of the at least one 3D data structure, based on respective viewpoints from which corresponding depth images are captured, to generate a 3D depth model of the given real-world environment;
determine, from the 3D depth model, an optical depth of a given pixel corresponding to a given ray from a 3D position of a given viewpoint, based on a direction of the given ray;
select a lower bound and an upper bound for the given ray, based on the determined optical depth of the given pixel; and
during training of the at least one neural network:
march the given ray within the lower bound and the upper bound, or
force an opacity function of the at least one neural network to return a zero value for any sample point on the given ray before the lower bound.

16. The system of claim 12, wherein when utilising the at least one neural network to ray march for the gaze portion, the at least one server is configured to:

process depth information in depth tiles of the plurality of nodes of the at least one 3D data structure, based on respective viewpoints from which corresponding depth images are captured, to generate a 3D depth model of the given real-world environment;

determine, from the 3D depth model, an optical depth of a given pixel corresponding to a given ray from a 3D position of the given viewpoint, based on a direction of the given ray;

select a lower bound and an upper bound for the given ray, based on the determined optical depth of the given pixel; and march the given ray within the lower bound and the upper bound in the gaze portion of the determined region of the given real-world environment, to generate the gaze segment of the given image with the at least one neural network.

17. The system of claim 12, wherein the at least one server is configured to:

determine an intermediate portion of the determined region of the given real-world environment, based on the gaze direction of the given user, wherein the intermediate portion lies between the gaze portion and the peripheral portion;

utilise the at least one 3D model of the given real-world environment, to generate an intermediate segment of the given image that corresponds to the intermediate portion of the determined region of the given real-world environment; and inpaint missing pixels in the intermediate segment of the given image, by utilising the at least one neural network.

18. The system of claim 17, wherein the at least one server is configured to inpaint missing pixels in the peripheral segment of the given image, by utilising the at least one neural network.

19. The system of claim 17, wherein when generating the intermediate segment of the given image, a ratio of a density of pixels generated by utilising the at least one neural network and a density of pixels generated by utilising the at least one 3D model decreases on going away from the gaze portion.

20. The system of claim 12, wherein the at least one server is configured to:

determine an intermediate portion of the determined region of the given real-world environment, based on the gaze direction of the given user, wherein the intermediate portion lies between the gaze portion and the peripheral portion; and utilise the at least one neural network to ray march for the intermediate portion of the determined region of the given real-world environment, to generate an intermediate segment of the given image that corresponds to the intermediate portion of the determined region of the given real-world environment, wherein the intermediate segment is generated using at least one of: a coarser step size for ray marching, a lower pixel resolution than the gaze segment.

21. The system of claim 20, wherein when generating the intermediate segment of the given image, a step size for ray marching increases on going away from the gaze portion.

* * * * *